(12) United States Patent
Orita et al.

(10) Patent No.: US 11,132,095 B2
(45) Date of Patent: Sep. 28, 2021

(54) TACTILE PRESENTATION PANEL, TACTILE PRESENTATION TOUCH PANEL, AND TACTILE PRESENTATION TOUCH DISPLAY

(71) Applicant: Mitsubishi Electric Corporation, Chiyoda-ku (JP)

(72) Inventors: Tae Orita, Tokyo (JP); Masafumi Agari, Tokyo (JP); Takeshi Ono, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/628,479

(22) PCT Filed: Apr. 16, 2018

(86) PCT No.: PCT/JP2018/015705
§ 371 (c)(1),
(2) Date: Jan. 3, 2020

(87) PCT Pub. No.: WO2019/030987
PCT Pub. Date: Feb. 14, 2019

(65) Prior Publication Data
US 2020/0218351 A1    Jul. 9, 2020

(30) Foreign Application Priority Data
Aug. 7, 2017 (JP) .............. JP2017-152189

(51) Int. Cl.
*G06F 3/01* (2006.01)
*G06F 3/044* (2006.01)
*G06F 3/041* (2006.01)

(52) U.S. Cl.
CPC ............ *G06F 3/0446* (2019.05); *G06F 3/016* (2013.01); *G06F 3/0416* (2013.01); *G06F 3/0443* (2019.05); *G06F 3/0445* (2019.05)

(58) Field of Classification Search
None
See application file for complete search history.

(56) References Cited

U.S. PATENT DOCUMENTS 5,844,506 A    12/1998  Binstead
2011/0285666 A1  11/2011  Poupyrev et al.
(Continued)

FOREIGN PATENT DOCUMENTS

JP    2011-248884 A    12/2011
JP    2014-59833 A     4/2014
(Continued)

OTHER PUBLICATIONS

International Search Report dated Jul. 3, 2018 in PCT/JP2018/015705 filed Apr. 16, 2018, 1 page.
(Continued)

*Primary Examiner* — Krishna P Neupane
(74) *Attorney, Agent, or Firm* — Xsensus LLP

(57) ABSTRACT

Tactile electrodes include a plurality of first electrodes and a plurality of second electrodes that are alternately arranged with an interval therebetween on a transparent insulating substrate. A dielectric layer covers the tactile electrodes. A voltage supply circuit applies a voltage signal having a first frequency to those of the first electrodes that are located on at least a partial region of the transparent insulating substrate, and applies a voltage signal having a second frequency different from the first frequency to those of the second electrodes that are located on at least the partial region of the transparent insulating substrate.

21 Claims, 30 Drawing Sheets

(56) References Cited

U.S. PATENT DOCUMENTS

| | | | |
|---|---|---|---|
| 2013/0307789 A1* | 11/2013 | Karamath | G06F 3/016 345/173 |
| 2014/0146005 A1* | 5/2014 | Hong | G06F 3/04166 345/174 |
| 2015/0103024 A1* | 4/2015 | Haga | G06F 3/016 345/173 |
| 2016/0179260 A1 | 6/2016 | Ham et al. | |
| 2016/0282944 A1* | 9/2016 | Haga | G06F 3/04886 |
| 2017/0010720 A1* | 1/2017 | Nakayama | G06F 3/04164 |
| 2018/0113511 A1* | 4/2018 | Haga | G06F 3/04166 |

FOREIGN PATENT DOCUMENTS

| | | |
|---|---|---|
| JP | 2015-95211 A | 5/2015 |
| JP | 2015-97076 A | 5/2015 |
| JP | 2016-129015 A | 7/2016 |
| WO | WO 95/27334 A1 | 10/1995 |

OTHER PUBLICATIONS

Japanese Office Action dated Nov. 27, 2018 in Japanese Patent Application No. 2018-549602 (with English translation), 8 pages.
Sakaguchi et al., "Decision of Character Size and Color for On-Board Displays Based on Human Vision," Electronic Journal R&D, Review of Toyota CRDL, Jun. 2000, vol. 35, No. 2, pp. 11-18 (with English abstract).

\* cited by examiner

F I G. 1
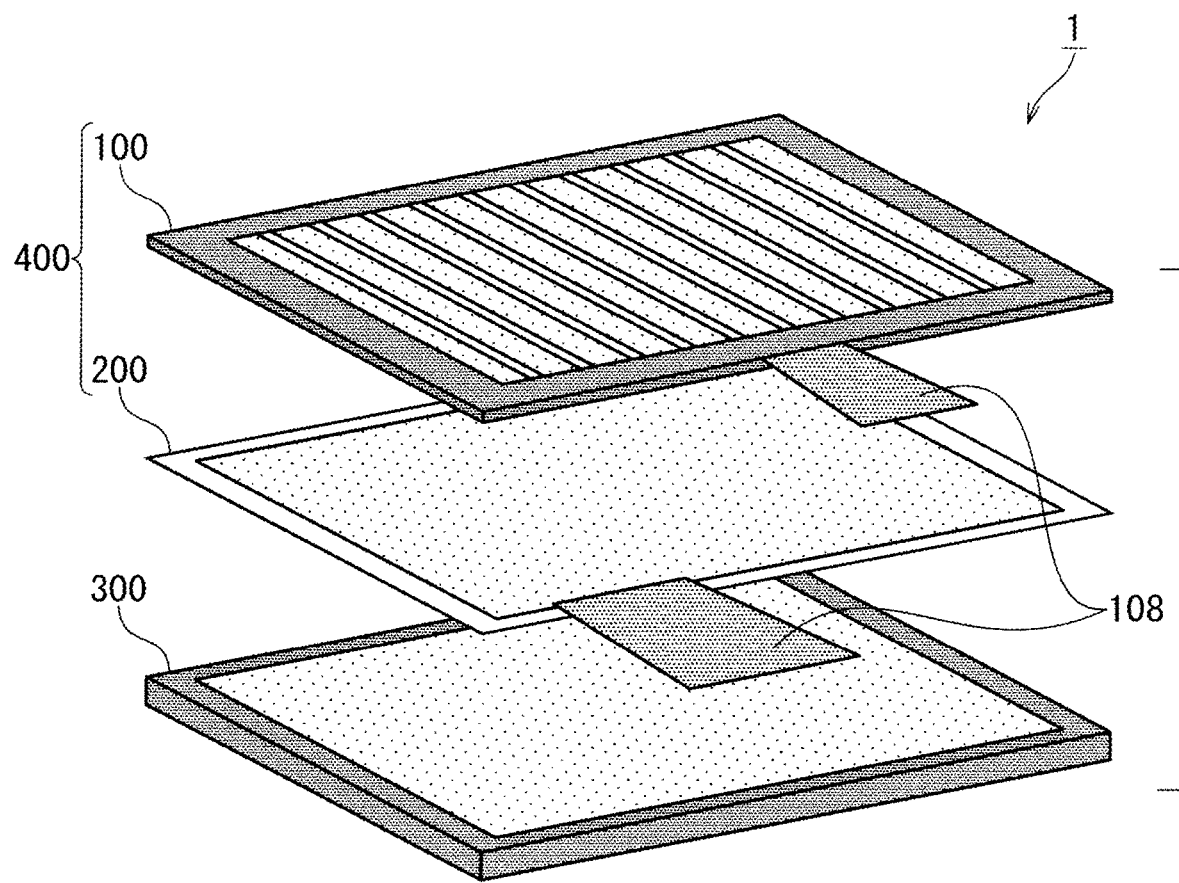

F I G. 1 3
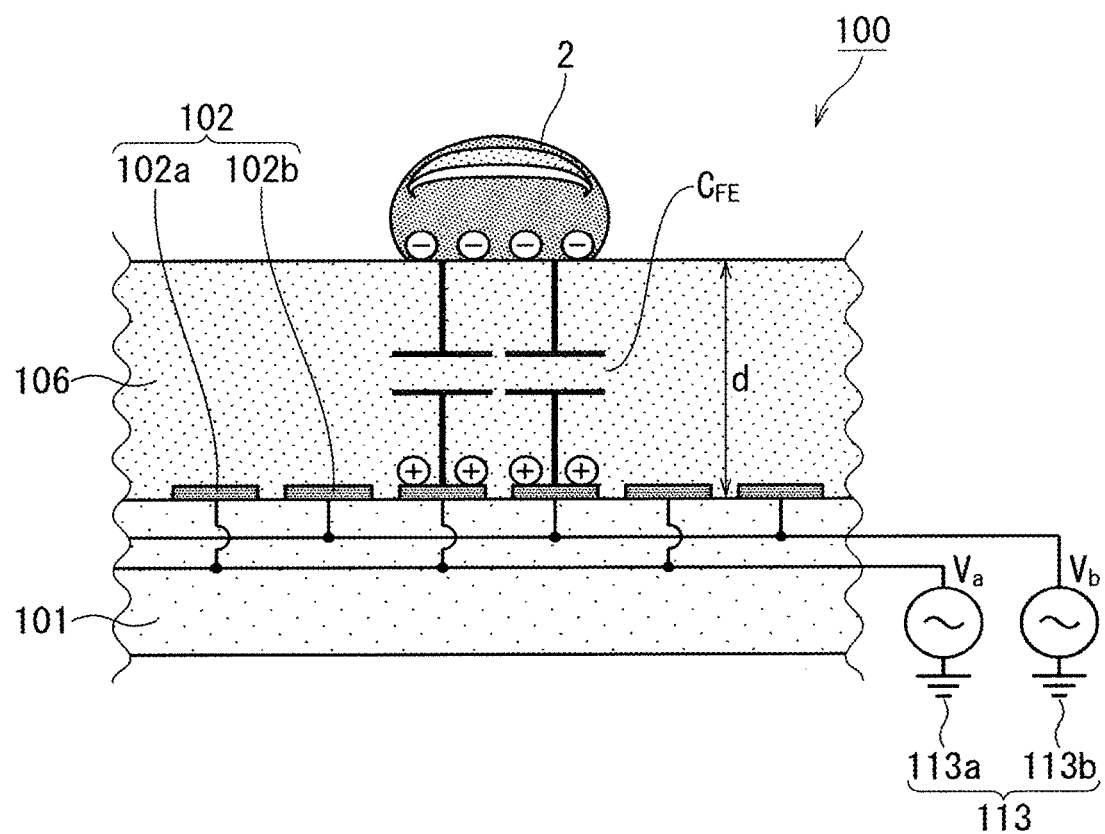

F I G. 1 5
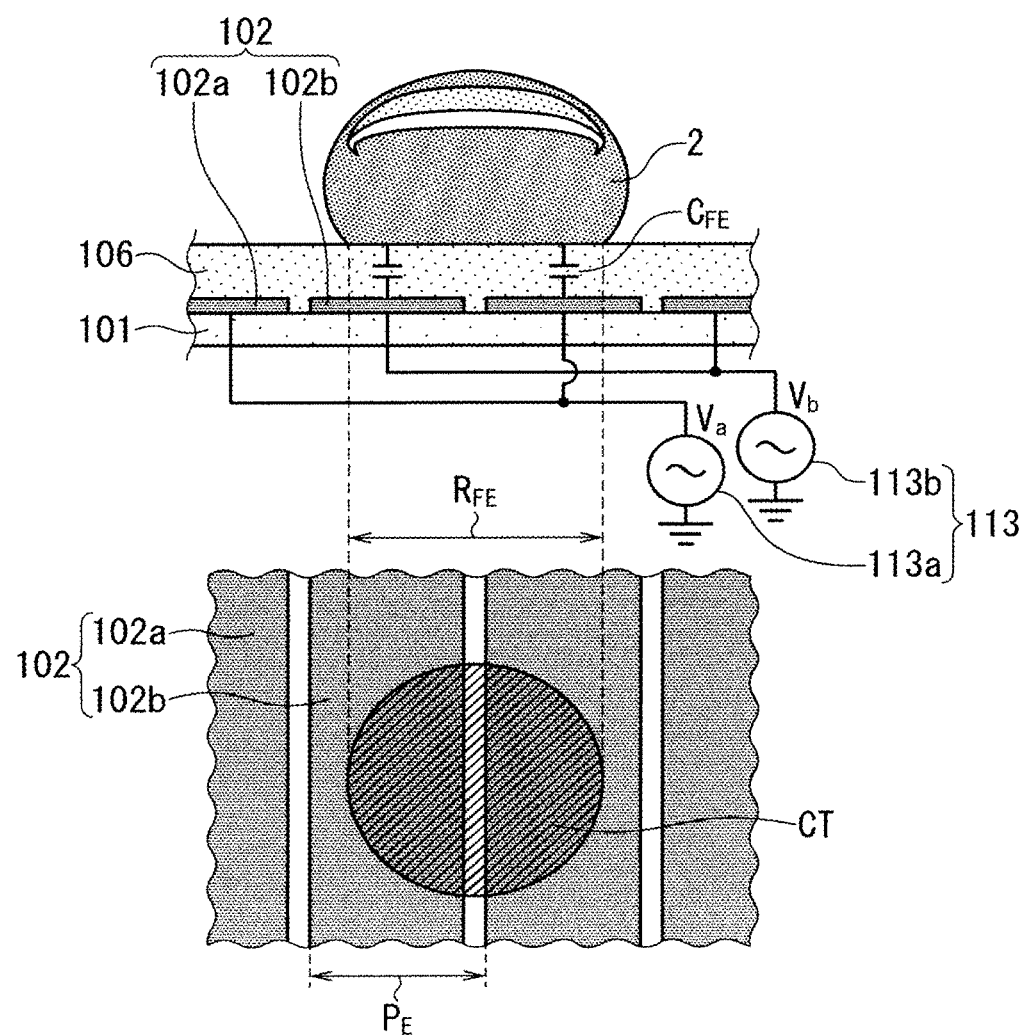

F I G. 3 2
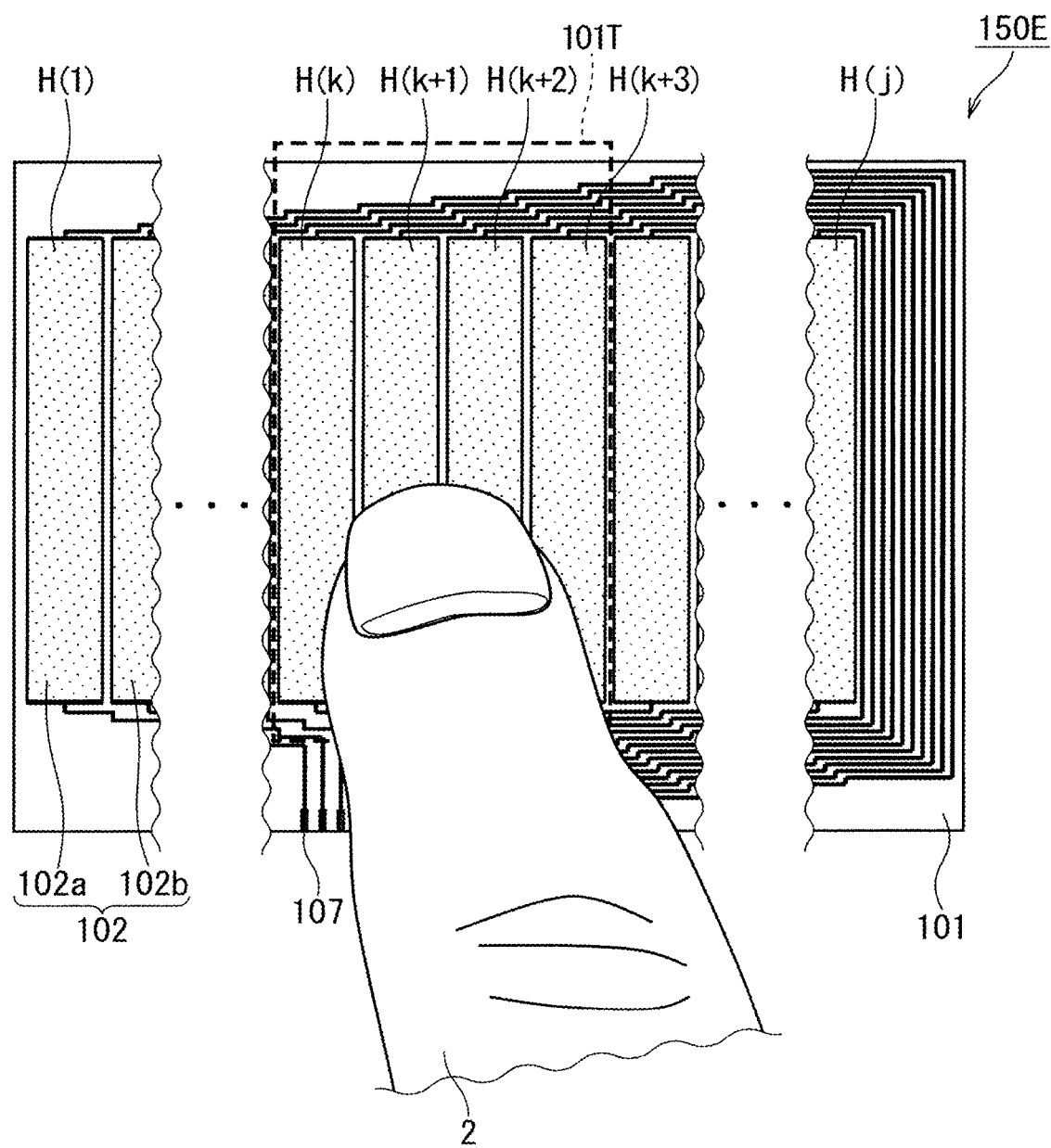

TACTILE PRESENTATION PANEL, TACTILE PRESENTATION TOUCH PANEL, AND TACTILE PRESENTATION TOUCH DISPLAY

TECHNICAL FIELD

The present invention relates to a tactile presentation panel, a tactile presentation touch panel, and a tactile presentation touch display.

BACKGROUND ART

Touch panels are widely known as devices that detect and output a position (hereinafter, also referred to as a "touch position") indicated on a touch screen by an indicator such as a user's finger or a pen. As one example of the method for detecting a touch position with the touch panels, there is capacitive sensing. One example of the touch panels using this method is a projected capacitive touch panel (PCAP). The PCAP is capable of detecting a touch position even if the user-side surface (hereinafter, also referred to as the "front-side surface") of the touch screen is covered with a protection plate such as a glass plate having a thickness of approximately several millimeters. In this way, the PCAP can have a protection plate on the front-side surface and is thus excellent in robustness. The PCAP also has a long life because it does not have a moving part. The touch screen of the PCAP includes detection row-direction wiring layers that detect the coordinate of a touch position in the row direction, and detection column-direction wiring layers that detect the coordinate of a touch position in the column direction. In the following description, the detection row-direction wiring layers and the detection column-direction wiring layers are also collectively referred to as "detection wiring layers." A member on which the detection wiring layers are disposed is referred to as a "touch screen," and a device obtained by connecting a detection circuit to the touch screen is referred to as a "touch panel." A region of the touch screen where a touch position can be detected is referred to as a "detectable region."

International Publication WO 95/27334 (Patent Document 1) discloses a touchpad system corresponding to a touch panel. As detection wiring layers for detecting an electrostatic capacitance (hereinafter, also simply referred to as a "capacitance"), the touchpad system includes a first series of conductor elements formed on a thin dielectric film, and a second series of conductor elements formed on the first series of conductor elements with an insulating film therebetween. As viewed in the direction of the normal to the front-side surface, the first series of conductor elements and the second series of conductor elements intersect with each other without electrical contact. The coordinates of a touch position are specified by a detection circuit detecting capacitances (hereinafter, also referred to as "touch capacitances") formed between an indicator such as a finger and the conductive elements, which are the detection wiring layers. A touch position between conductor elements can be interpolated using a relative value of detected capacitances at one or more conductor elements.

In recent years, touch panels are becoming used in various familiar pieces of equipment, instead of mechanical switches. The touch panels do not have asperities as seen in mechanical switches and provide a smooth texture, and their surface shapes do not become deformed by operations. Thus, unlike in the case of mechanical switches, when a switch on a touch panel is operated, the whole process from when the position of the switch displayed on the touch panel is confirmed to when the operation of the switch is completed has to be performed by relying on vision. In other words, touch typing is difficult. For this reason, some operations are difficult, such as those performed by visually impaired persons and those performed in parallel with other operations, e.g., operating an audio system or the like during automobile driving. However, from the viewpoint of design, the touch panels are becoming widely used in, for example, vehicle-mounted devices, and accordingly, touch typing during driving is becoming more difficult. The touch panels are also becoming used as control panels in many consumer equipment including home electric appliances and electronic equipment. Since the touch panels have smooth surfaces as described above, the positions of switches cannot be confirmed by feeling alone. Approaches to creating asperities at the switch positions on the protection glass surface is difficult to use, particularly in the case of PCAPs, from the viewpoint of design. Approaches to using audio functions to inform the operator of the start and end of acceptance of operations are only applicable to limited environments and cannot be adopted for general purpose use from the viewpoint of privacy or noise reduction. Therefore, with these approaches, it is difficult to address universal design needs.

If the touch panels are provided with the function of feeding back information such as the position of a switch, acceptance of operations via the switch, and completion of the operation through tactile sensations, it is possible to achieve touch typing operations and to meet universal design needs. For example, mobile phones and smartphones are widely equipped with tactile feedback functions using vibrations. In this way, feedback functions using vibrations that are linked with users' operations are rapidly becoming familiar to us, and demand for more advanced tactile feedback is also expected to increase.

Methods for creating tactile sensations are roughly divided into three categories: vibration methods, ultrasonic methods, and electric methods. The vibration methods are easy to apply to the PCAPs and low in cost, but have difficulty in incorporating vibrators into a casing in order to sufficiently vibrate the whole device. In particular, these methods are difficult to apply to large-area devices due to limited outputs of vibrators. The ultrasonic methods can create such tactile sensations as a sense of smoothness and slipperiness that cannot be created by other methods, but for similar reasons to those in the vibration methods, have difficulty in being incorporated into a casing as well as being applied to large-area devices. The electric methods require high driving voltages, but are easy to apply even to large-sized devices because there is no need to vibrate the devices. Moreover, the electric methods can create a tactile sensation at any location and can address the needs of multi-touching. The electric methods include, in addition to an electric stimulation method for giving electric stimulation directly to fingers, an electrostatic induction method for creating tactile sensations by a static electric force generated between tactile electrodes and a finger that has touched a panel surface. This method will be described hereinafter. In the following description, a member obtained by disposing tactile electrodes on a transparent insulating substrate is referred to as a "tactile presentation screen," and a device obtained by connecting a detection circuit to the tactile presentation screen is referred to as a "tactile presentation panel." A region of the tactile presentation screen where tactile sensations can be presented is referred to as a "tactile presentation enabled area."

As for the electrostatic induction methods, according to Japanese Patent Application Laid-Open No. 2011-248884

(Patent Document 2), the device includes a conductive surface, an insulation surface disposed on the conductive surface, and a controller that supplies signals to the conductive surface. The controller causes a signal to be coupled to a user who touches the insulation surface. Thus, a tactile sensation is perceived in at least one finger of the user that slides on the insulation surface.

According to Japanese Patent Application Laid-Open No. 2015-097076 (Patent Document 3), the tactile sense presentation device includes a plurality of X-electrodes and a plurality of Y-electrodes on a supporting substrate. The X-electrodes and the Y-electrodes intersect with each other at intersection points via an insulating film, so that electric insulation therebetween is maintained. A voltage signal of a first frequency is applied to a specific X-electrode, and a voltage signal of a second frequency is applied to a specific Y-electrode. Electric beat vibrations are generated in a target region in accordance with an absolute value of the difference between the first and second frequencies. This changes a frictional force formed between the tactile sense presentation device and the user's finger and thereby creates a sense of texture.

As for the electrostatic induction methods, according to Japanese Patent Application Laid-Open No. 2014-59833 (Patent Document 4), the tactile stimulation generation device includes a transparent insulation layer provided in a tactile stimulation presentation area that corresponds to an operation surface of a coordinate detection sheet, a large number of tactile generation electrodes that are disposed on one side of the insulation layer and that give tactile stimulation to fingertips that come in close proximity to or in contact with the electrodes, and a drive part that applies differential voltages having different polarities to the tactile generation electrodes. The tactile generation electrodes include first tactile electrodes and second tactile electrodes that are disposed with a gap therebetween.

As for the electrostatic induction methods, according to Japanese Patent Application Laid-Open No. 2016-129015 (Patent Document 5), the touch sensitive device includes an electroactive layer made of an electroactive polymer, and first and second electrodes that are disposed on only one side of the electroactive layer. For example, a positive voltage is applied to the first electrodes, and the second electrodes are grounded, so that a potential difference is generated between the first and second electrodes. The electroactive layer vibrates due to this potential difference, and the user can perceive a tactile sense feedback.

PRIOR ART DOCUMENTS

Patent Documents

Patent Document 1: International Publication WO 95/27334
Patent Document 2: Japanese Patent Application Laid-Open No. 2011-248884
Patent Document 3: Japanese Patent Application Laid-Open No. 2015-097076
Patent Document 4: Japanese Patent Application Laid-Open No. 2014-59833
Patent Document 5: Japanese Patent Application Laid-Open No. 2016-129015

SUMMARY

Problems to be Solved by the Invention

According to Japanese Patent Application Laid-Open No. 2015-097076 described above, the X-electrodes and the Y-electrodes are separated by the insulation film at the intersection points therebetween. The insulation film needs to have a certain degree of thickness in order to ensure a sufficient withstand voltage between the X-electrodes and the Y-electrodes at the intersection points. The intersection points become bowed outward in correspondence with this thickness, and this creates asperities. In order to sufficiently flatten these asperities, the thickness of the insulation layer that covers the electrodes needs to be increased. This consequently weakens the static electric force acting on the finger that has touched the tactile sense presentation device and accordingly weakens a tactile sensation to be created. A tactile sensation to be created may also be weakened due to difficulty in ensuring a large electrode area because of a complicated electrode structure and due to a reduction in capacitance between the electrodes and the finger as a result of capacitances formed between the electrodes at the intersections therebetween. It is possible to strengthen a tactile sensation by increasing the voltage signal applied to the electrodes, but in order to enable the use of higher voltages, the electric circuit will be complicated and it will be difficult to ensure the reliability of electrical insulation at the intersections.

Meanwhile, according to Japanese Patent Application Laid-Open No. 2011-248884 described above, there is no particular need to provide intersections, and accordingly the creation of asperities descried above can be avoided. However, with this technique, one type of voltage signal is applied to the tactile electrodes and directly reflected in the static electric force acting on a finger. Such a signal application method requires a higher signal voltage than a method in which two voltage signals are combined together as in the aforementioned technique disclosed in Japanese Patent Application Laid-Open No. 2015-097076.

According to Japanese Patent Application Laid-Open No. 2014-59833 described above, a gap is provided in plan view between the first tactile electrodes and the second tactile electrodes, so that the electrodes can be disposed without intersecting with each other. This configuration avoids the creation of asperities due to intersections. Meanwhile, since differential voltages with different polarities are applied to the first and second tactile electrodes in order to create a tactile sensation, current (or an excitation charge) flows through a path from the first tactile electrodes via the user's fingertips to the second tactile electrodes. With this method, it is difficult to adequately suppress the inflow of current into the human body, and this problem becomes particularly apparent under high-humidity environments.

According to Japanese Patent Application Laid-Open No. 2016-129015 described above, in order to create a tactile sensation by causing the electroactive layer to vibrate, a voltage is applied to the electroactive layer at a resonance frequency corresponding to the interval between the first and second electrodes. Since the resonance frequency is only one type of frequency that corresponds to the interval between the first and second electrodes, the device cannot create multiple tactile sensations.

As described above, with any of these techniques described above, it is difficult to create a strong tactile sensation with a low signal voltage. The voltage for tactile electrodes is usually significantly higher than the voltage for use in detecting a touch position. Therefore, if the voltage for tactile electrodes can be reduced, it is possible to considerably simplify the configuration of the electrical system.

The present invention has been made in view of the problems as described above, and it is an object of the present invention to provide a tactile presentation panel, a tactile presentation touch panel, and a tactile presentation touch display that can create a strong enough tactile sensation with lower voltage signals.

Means to Solve the Problems

The tactile presentation panel according to the present invention includes a transparent insulating substrate, a plurality of tactile electrodes, a dielectric layer, and a voltage supply circuit. The plurality of tactile electrodes includes a plurality of first electrodes and a plurality of second electrodes, the plurality of first electrodes and the plurality of second electrodes being alternately arranged with an interval therebetween on the transparent insulating substrate. The dielectric layer covers the plurality of tactile electrodes. The voltage supply circuit applies a voltage having a first frequency to first electrodes that are located on at least a partial region of the transparent insulating substrate among the plurality of first electrodes, and applies a voltage signal having a second frequency different from the first frequency to second electrodes that are located on at least the partial region of the transparent insulating substrate among the plurality of second electrodes.

Effects of the Invention

According to the present invention, firstly, the first electrodes and the second electrodes are disposed in the same layer with an interval therebetween, so that no intersections are formed. This simplifies the structure and eliminates the need to increase the thickness of the dielectric layer in order to flatten asperities at intersections. Accordingly, it is possible to avoid a situation where the static electric force acting on the indicator is weakened due to a great thickness of the dielectric layer. Secondly, the voltage signal of the first frequency and the voltage signal of the second frequency different from the first frequency are applied respectively to the plurality of first electrodes and the plurality of second electrodes, the first and second electrodes being alternately disposed with an interval therebetween. As a result, a static electric force generated by a voltage signal that is generated by a combination of the two voltage signals and that is amplified more than the input signals acts on the indicator that has touched a region extending over the first and second electrodes via the dielectric layer. Accordingly, it is possible to cause a stronger static electric force to act on the indicator than in the case where a single voltage signal is applied. From the above, a strong enough tactile sensation can be created with lower voltage signals.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is an exploded perspective view schematically illustrating a configuration of a tactile presentation touch display according to Embodiment 1 of the present invention;

FIG. 13 is a schematic diagram for describing the formation of the electrostatic capacitances between the indicator and the tactile electrodes on the tactile presentation panel in FIG. 2;

FIG. 15 is a schematic diagram for describing the formation of the electrostatic capacitances between the tactile electrodes and the indicator when the pitch of the tactile electrodes on the tactile presentation panel in FIG. 2 is less than the contact diameter;

FIG. 32 is a plan view illustrating, together with an indicator, a configuration of a tactile presentation screen according to Embodiment 10 of the present invention;

DESCRIPTION OF EMBODIMENTS

Figure 2:
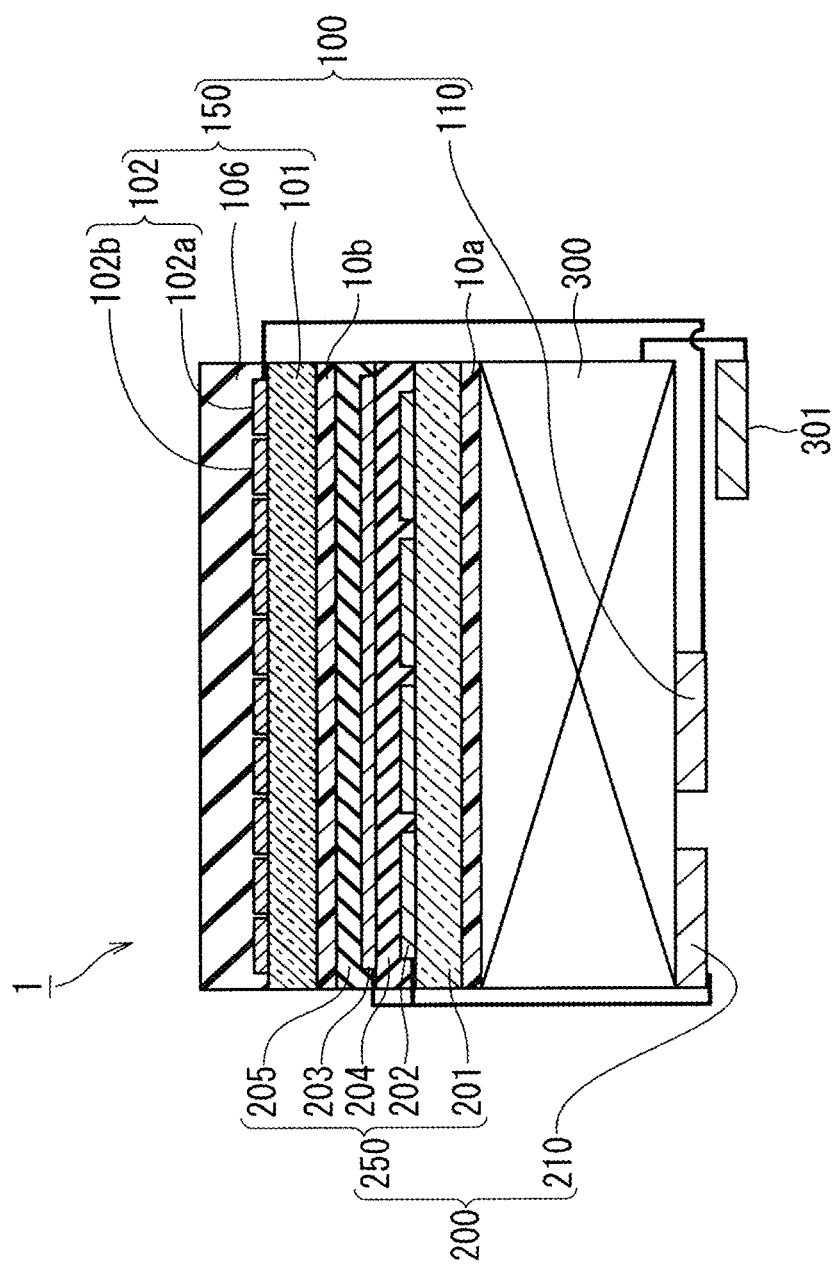
FIG. 2 is a sectional view schematically illustrating the configuration of the tactile presentation touch display in FIG. 1.

Embodiments of the present invention will be described hereinafter with reference to the drawings. In the drawings described below, identical or corresponding components are given the same reference sign, and description thereof is not repeated.

Embodiment 1

Tactile Presentation Touch Display

FIG. 1 is an exploded perspective view schematically illustrating a configuration of a tactile presentation touch display 1 according to Embodiment 1 of the present invention. FIG. 2 is a sectional view schematically illustrating the configuration of the tactile presentation touch display 1.

The tactile presentation touch display 1 includes a tactile presentation touch panel 400 and a display panel 300 on which the tactile presentation touch panel 400 is mounted. The tactile presentation touch panel 400 includes a tactile presentation panel 100 and a touch panel 200. The tactile presentation panel 100 includes a tactile presentation screen 150 and a voltage supply circuit 110. The touch panel 200 includes a touch screen 250 and a touch detection circuit 210.

In the present embodiment, the tactile presentation screen 150 is disposed on a side (front side) of the tactile presentation touch display 1 that faces toward a user, and is fixed with an adhesive 10b to a surface (front-side surface) of the touch screen 250 that faces toward the user. The touch screen 250 is fixed with an adhesive 10a to a surface (front-side face) of the display panel 300 that faces toward the user.

The tactile presentation screen 150 includes a transparent insulating substrate 101, tactile electrodes 102, and a dielectric layer 106. The tactile electrodes 102 include a plurality of first electrodes 102a and a plurality of second electrodes 102b, the first electrodes 102a and the second electrode 102b being alternately disposed with an interval therebetween on the transparent insulating substrate 101. The dielectric layer 106 covers the tactile electrodes 102. The tactile presentation screen 150 is electrically connected to the voltage supply circuit 110 by a flexible print circuit (FPC) 108.

The touch screen 250 includes a transparent substrate 201 having insulating properties, excitation electrodes 202, detection electrodes 203, an interlayer insulation layer 204, and an insulation layer 205. The touch screen 250 is electrically connected to the touch detection circuit 210 by an FPC 108. The touch detection circuit 210 detects a position touched on the transparent insulating substrate 101 of the tactile presentation screen 150. This enables not only presenting a tactile sensation but also detecting a touch position on the transparent insulating substrate 101. The touch detection circuit 210 includes, for example, a microcomputer and a detection integrated circuit (IC) for detecting a change in electrostatic capacitance, caused by touching. The details of the configuration of the touch screen 250 will be described later using a specific example.

The display panel 300 includes two opposing transparent insulating substrates and a display function layer sandwiched between the two insulating substrates and having a display function. The display panel 300 is typically a liquid crystal panel. The display panel 300 may be an organic electroluminescent (EL) panel or an electronic paper panel. The touch panel 200 is typically a PCAP.

Overview of Tactile Presentation Panel

Figure 3:
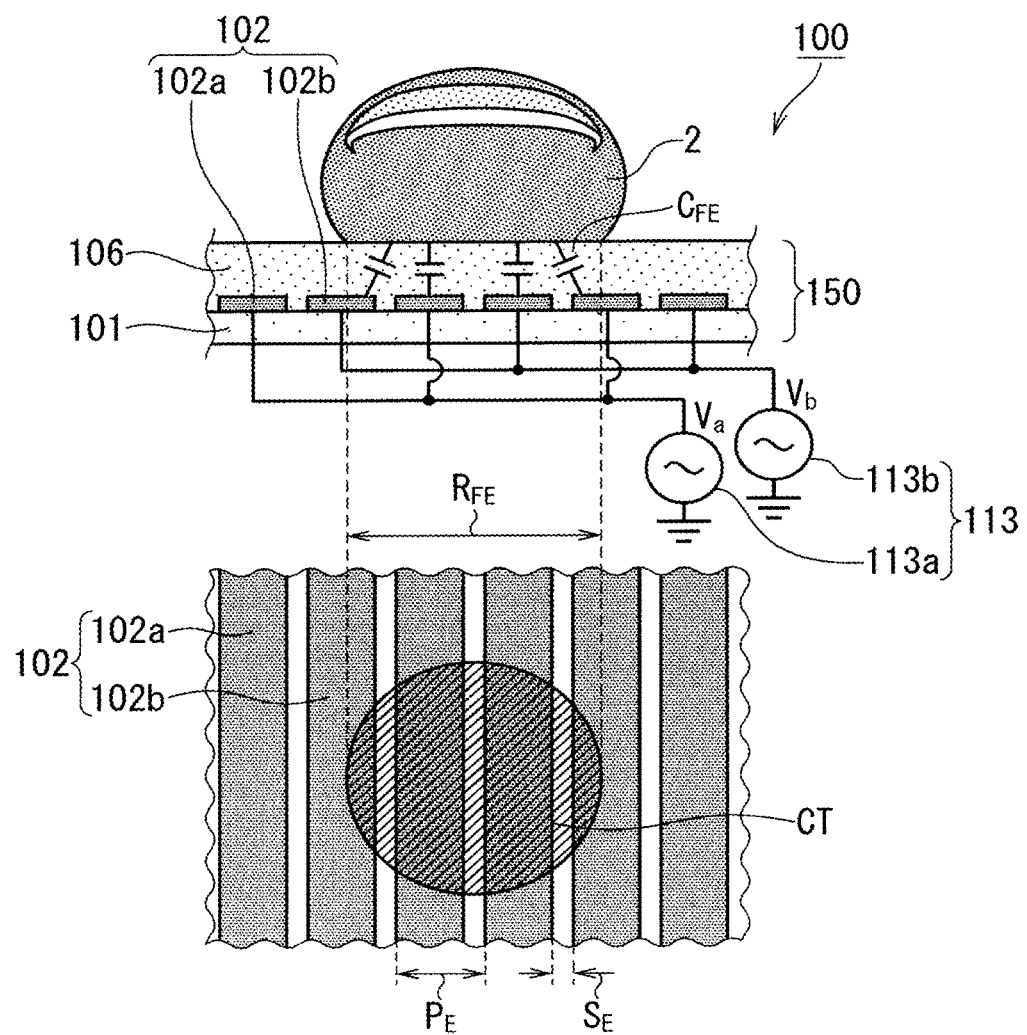
FIG. 3 is a schematic diagram illustrating how electrostatic capacitances are formed between an indicator and tactile electrodes of a tactile presentation panel in FIG. 2.
Figure 4:
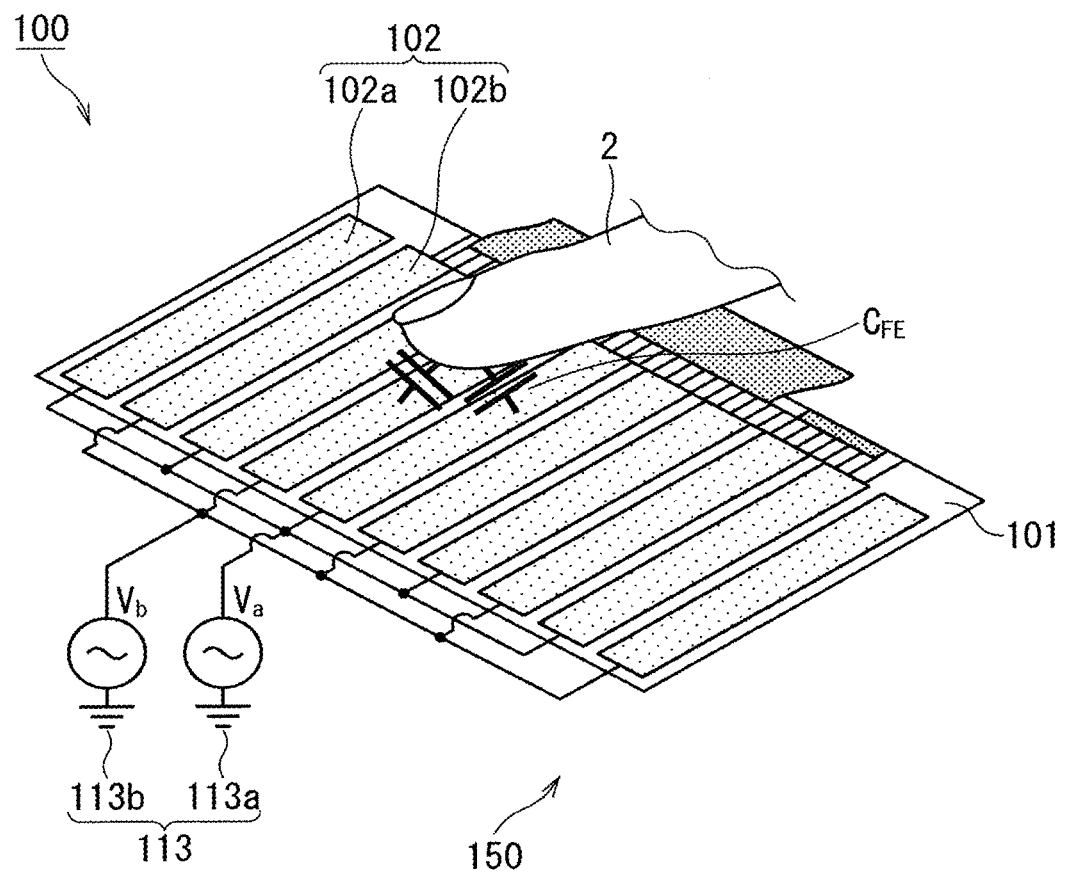
FIG. 4 is a perspective view illustrating how electrostatic capacitances are formed between the indicator and the tactile electrodes of the tactile presentation panel in FIG. 2.

FIG. 3 is a schematic diagram taken along a section and for describing how electrostatic capacitances $C_{FE}$ are formed between an indicator 2 and the tactile electrodes 102 of the tactile presentation panel 100. FIG. 4 is a corresponding perspective view. When the indicator 2, more specifically a user's fingertip, has touched a contact surface CT that is part of the front-side surface of the tactile presentation screen 150, electrostatic capacitances $C_{FE}$ are formed between the tactile electrodes 102 and the indicator 2 on the contact surface CT via the dielectric layer 106. In FIGS. 3 and 4, a tactile-presentation-voltage generating circuit 113 included in the voltage supply circuit 110 (FIG. 2) is only illustrated to facilitate viewing, and other configurations included in the voltage supply circuit 110 (FIG. 2) are not illustrated. A more specific configuration of the voltage supply circuit 110 will be described later.

The tactile-presentation-voltage generating circuit 113 in the voltage supply circuit 110 (FIG. 2) includes a first voltage generating circuit 113a and a second voltage generating circuit 113b. The first voltage generating circuit 113a is configured to apply a voltage signal $V_a$ to those of the first electrodes 102a that are located on at least a partial region of the transparent insulating substrate 101, and in the present embodiment, configured to apply the voltage signal $V_a$ to all of the first electrodes 102a. The second voltage generating circuit 113b is configured to apply a voltage signal $V_b$ to those of the second electrodes 102b that are located on at least a partial region of the transparent insulating substrate 101, and in the present embodiment, configured to apply the voltage signal $V_b$ to all of the second electrodes 102b.

Figure 5:
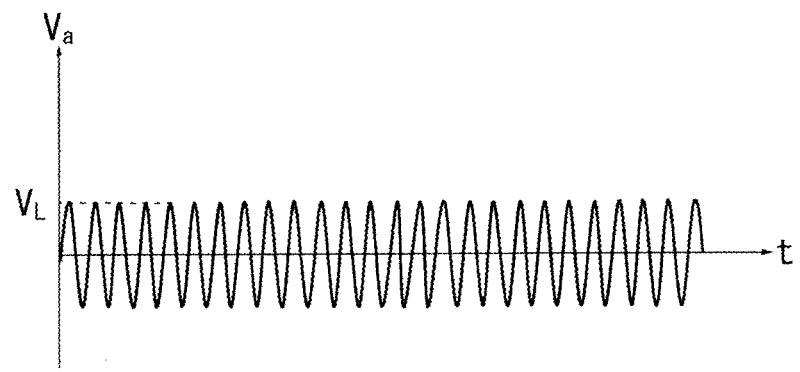
FIG. 5 is a graph illustrating an example of a voltage signal having a first frequency and applied to first electrodes in FIG. 2.
Figure 6:
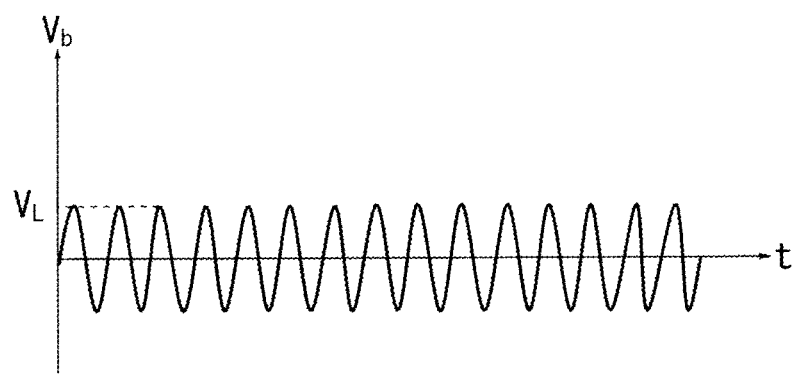
FIG. 6 is a graph illustrating an example of a voltage signal having a second frequency and applied to second electrodes in FIG. 2.

FIGS. 5 and 6 are graphs illustrating examples of the voltage signals $V_a$ and $V_b$. The voltage signal $V_a$ generated by the first voltage generating circuit 113a has a first frequency. The voltage signal $V_b$ generated by the second voltage generating circuit 113b has a second frequency different from the first frequency. The voltage signals $V_a$ and $V_b$ may have the same amplitude $V_L$. In the illustrated example, sinusoidal waves having different frequencies are used as the voltage signals $V_a$ and $V_b$. Instead of the sinusoidal waves, pulse waves or other waves having different shapes may be used. The amplitude $V_L$ is preferably approximately several tens of volts in order to create a strong enough tactile sensation.

Figure 7:
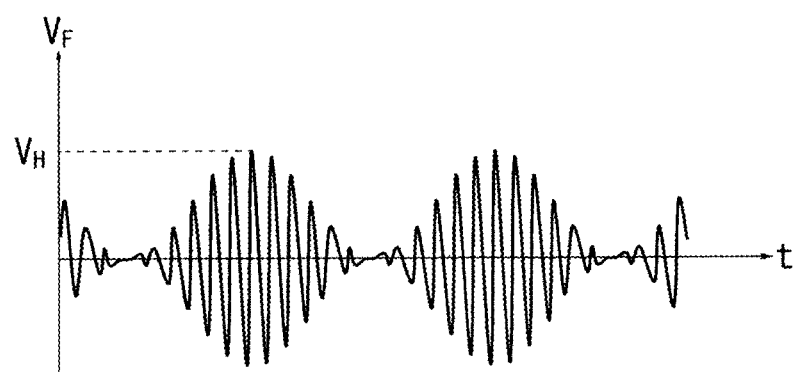
FIG. 7 is a graph illustrating an amplitude modulating signal generated by a combination of the voltage signals in FIGS. 5 and 6.

FIG. 7 is a graph illustrating an amplitude modulating signal $V_F$ generated by a combination of the voltage signals $V_a$ (FIG. 5) and $V_b$ (FIG. 6). The voltage signal $V_a$ is applied to the first electrodes 102a, and the voltage signal $V_b$ is applied to the second electrodes 102b. As a result, charging and discharging is repeated in accordance with the amplitude modulating signal $V_F$ having a maximum amplitude $V_H$, that is approximately two times the amplitude $V_L$, in a region where the electrostatic capacitances $C_{FE}$ (FIG. 4) are formed between the indicator 2 and each of the first and second electrodes 102a and 102b. The result is that a static electric force corresponding to the amplitude modulating signal $V_F$ having the maximum amplitude $V_H$ acts on the indicator 2 that is in contact with a region that extends over both first and second electrodes 102a and 102b via the dielectric layer 106. The amplitude modulating signal $V_F$ has a beat frequency corresponding to a difference between the aforementioned first and second frequencies. Thus, when the indicator 2 moves on the tactile presentation screen 150, a frictional force acting on the indicator 2 changes at the aforementioned beat frequency. As a result, the indicator 2 vibrates at the beat frequency. The vibrations of the indicator 2 are perceived by the user as a tactile sensation obtained from the tactile presentation screen 150. As described above, the tactile presentation screen 150 of the tactile presentation panel 100 is configured to create a tactile sensation by controlling the static electric force acting on the indicator 2 so as to change the frictional force acting on the indicator 2.

As described above, the amplitude modulating signal $V_F$ having a voltage that is approximately two times those of the input voltage signals $V_a$ (FIG. 5) and $V_b$ (FIG. 6) is generated. In this way, the amplitude modulating signal $V_F$ necessary to cause a desired frictional force to act on the indicator 2 can be generated from the voltage signals $V_a$ (FIG. 5) and $V_b$ (FIG. 6), each having a voltage that is approximately a half of the voltage of the amplitude modulating signal $V_F$. Thus, an equivalent static electric force can be generated from a half of the voltage applied when an amplitude modulating signal is input directly to the first and second electrodes 102a and 102b. Accordingly, low-voltage drive is possible.

In order to present a strong enough tactile sensation, it is sufficient for the maximum amplitude $V_H$ to be large enough correspondingly, and the amplitude $V_L$ may be small in value by comparison. Thus, the amplitude $V_L$ itself does not necessarily have to be large enough to create a strong enough tactile sensation. As a result of setting the amplitude $V_L$ in this way, when the indicator 2 is in contact with only either one of the first and second electrodes 102a and 102b, the user can hardly perceive a tactile sensation, irrespective of what frequency is selected for the voltage signals $V_a$ and $V_b$.

In order for the indicator 2 to be easily located in a region extending over both first and second electrodes 102a and 102b, a pitch $P_E$ of the tactile electrodes 102 is preferably smaller than a diameter $R_{FE}$ of the contact surface CT. The details of this will be described later.

Touch Panel

Figure 8:
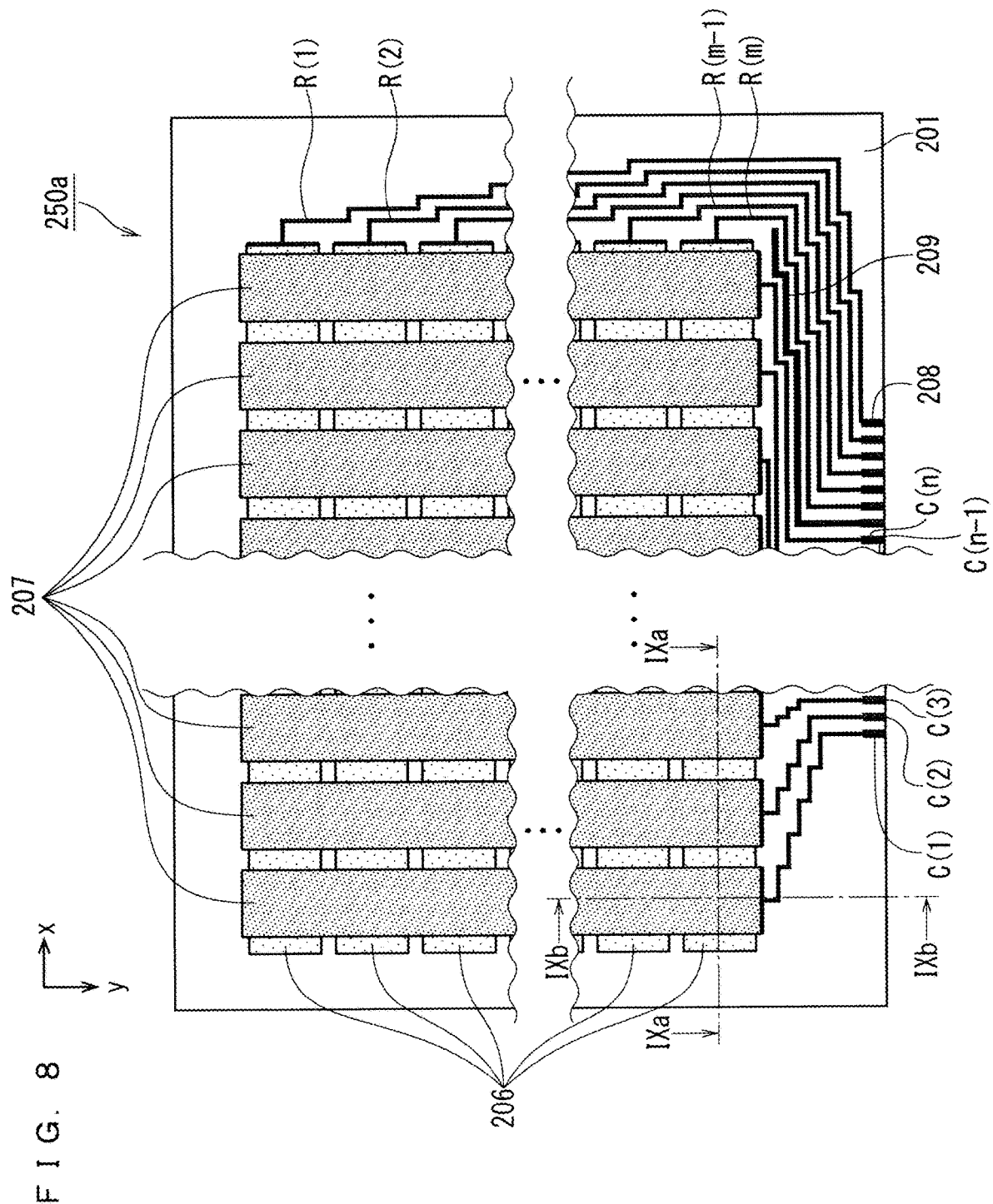
FIG. 8 is a plan view illustrating a first example of a touch screen in FIG. 2.
Figure 9:
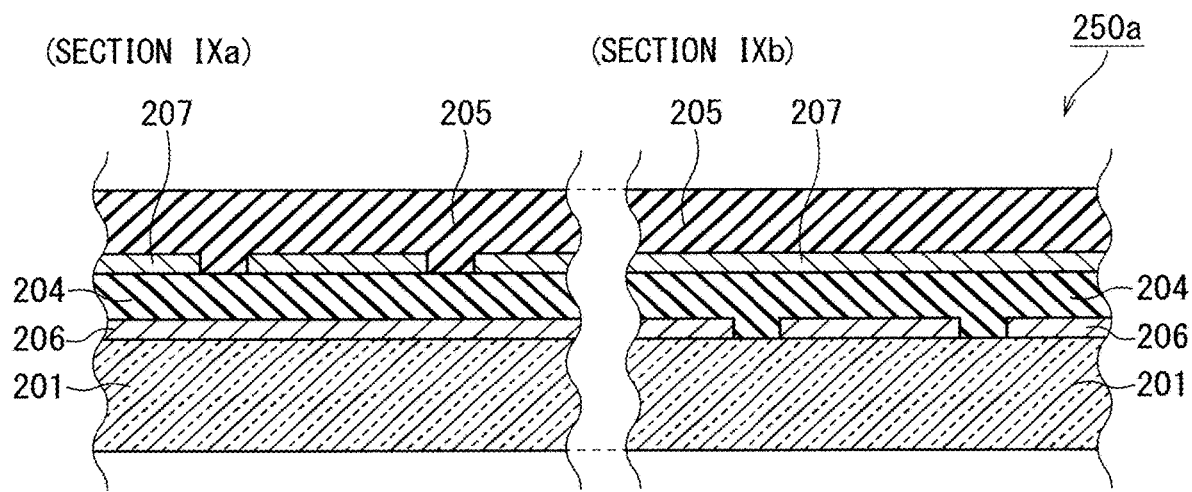
FIG. 9 is a partial sectional view taken along lines IXa-IXa and IXb-IXb in FIG. 8.

FIG. 8 is a plan view of a touch screen 250a using a capacitive sensing method as a first example of the touch screen 250 (FIG. 2). FIG. 9 is a partial sectional view taken along lines IXa-IXa and IXb-IXb in FIG. 8.

The touch screen 250a includes a plurality of row-direction wiring layers 206 and a plurality of column-direction wiring layers 207. Each row-direction wiring layer 206 includes a plurality of electrically connected excitation electrodes 202 (FIG. 2), and each column-direction wiring layer 207 includes a plurality of electrically connected detection electrodes 203 (FIG. 2). In FIGS. 8 and 9, the row-direction wiring layers 206 and the column-direction wiring layers 207 are illustrated in disregard of these fine structures. The excitation electrodes 202 (FIG. 2) are formed of a monolayer metal film or a multilayer metal film, or have a multilayer structure that includes either a monolayer metal film or a multilayer metal film and further includes another conductive material. Preferable examples of the metal are those having low resistance such as aluminum or silver. The same applies to the detection electrodes 203 (FIG. 2). Wiring resistance can be reduced by using a metal as a wiring material. On the other hand, metal wiring is opaque and easy to be visually identified. In order to reduce visibility and increase the transmittance of the touch screen, the metal wiring may have a fine-line structure. The fine-line structure typically has a mesh shape.

Each row-direction wiring layer 206 extends in the row direction (x direction in FIG. 8), and each column-direction wiring layer 207 extends in the column direction (y direction in FIG. 8). The row-direction wiring layers 206 are aligned in the column direction with an interval therebetween. The column-direction wiring layers 207 are aligned in the row direction with an interval therebetween. In the plan view (FIG. 8), each row-direction wiring layer 206 intersects with the plurality of column-direction wiring layers 207, and each column-direction wiring layer 207'intersects with the plurality of row-direction wiring layers 206. The row-direction wiring layers 206 and the column-direction wiring layers 207 are insulated by the interlayer insulation layer 204.

The interlayer insulation layer 204 is formed of a monolayer or multilayer organic insulation film, or a monolayer or multilayer inorganic insulation film. The inorganic insulation film is superior in improving resistance to moisture, and the organic insulation film is superior in improving flatness. Examples of the inorganic insulation film include transparent silicon-based inorganic insulation films such as a silicon oxide film, a silicon nitride film, and a silicon oxy-nitride film; and transparent inorganic insulation films made of metal oxides such as alumina. Examples of the material that can be used for the organic insulation film include polymeric materials that have a main chain formed of a silicon oxide, a silicon nitride film, or a silicon oxy-nitride film and that have a side chain or functional group coupled to an organic substance, and thermosetting resins having a main carbon chain. Examples of the resins that can be used include acrylic resins, polyimide resins, epoxy resins, novolac resins, and olefin resins.

The row-direction wiring layers 206 of the touch screen 250a are connected to a touch screen terminal area 208 by lead wiring layers R(1) to R(m). The column-direction wiring layers 207 are connected to the touch screen terminal area 208 by lead wiring layers C(1) to C(n). The touch screen terminal area 208 is provided in the edge portion of the substrate 201.

The lead wiring layers R(1) to R(m) are disposed outside a detectable area and extend to their corresponding electrodes so as to achieve almost shortest distances in order from those that are located closer to the center of alignment in the touch screen terminal area 208. The lead wiring layers R(1) to R(m) are disposed as densely as possible while ensuring mutual insulation. The same applies to the lead wiring layers C(1) to C(n). With this arrangement, it is possible to reduce the area ratio of the portion outside the detectable area in the substrate 201.

Alternatively, a shield wiring layer 209 may be provided between the group of lead wiring layers R(1) to R(m) and the group of lead wiring layers C(1) to C(n). This suppresses the generation of noise in one of the groups due to the influence of the other group. This also reduces the influence of electromagnetic noise generated from the display panel 300 (FIG. 2) on the lead wiring layers. The shield wiring layer 209 may be formed of the same material at the same time as the row-direction wiring layers 206 or the column-direction wiring layers 207.

The insulation layer 205 is provided on the substrate 201 so as to expose the touch screen terminal area 208, and covers the row-direction wiring layers 206, the column-direction wiring layers 207, and the interlayer insulation layer 204. The insulation layer 205 may be formed of the same material as the interlayer insulation layer 204. In the case where the display panel 300 is a liquid crystal panel, an upper polarizing plate that has undergone anti-glare treatment for liquid crystal panels may be mounted on a portion of the insulation layer 205 that transmits light for display.

Figure 10:
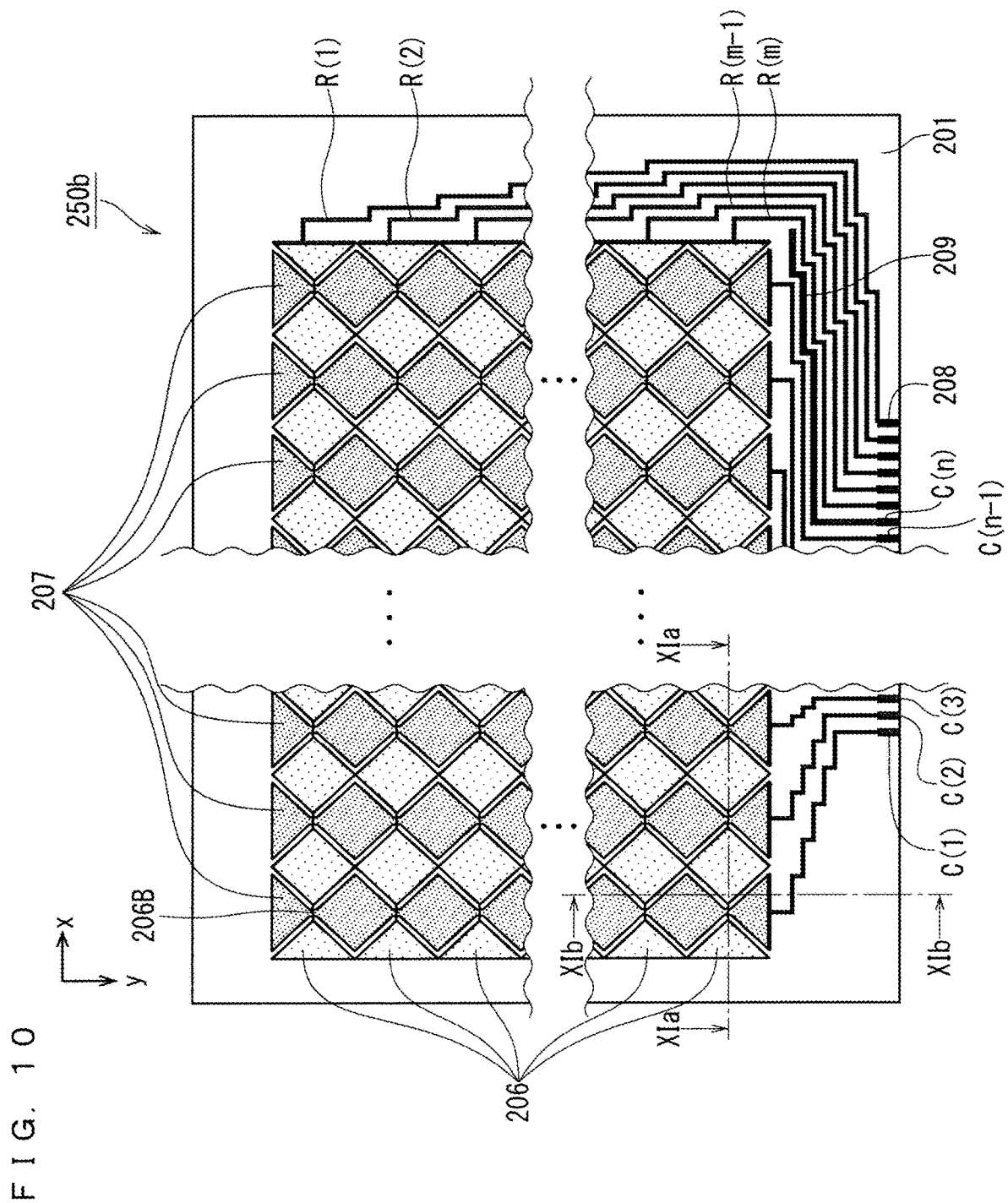
FIG. 10 is a plan view illustrating a second example of the touch screen in FIG. 2.
Figure 11:
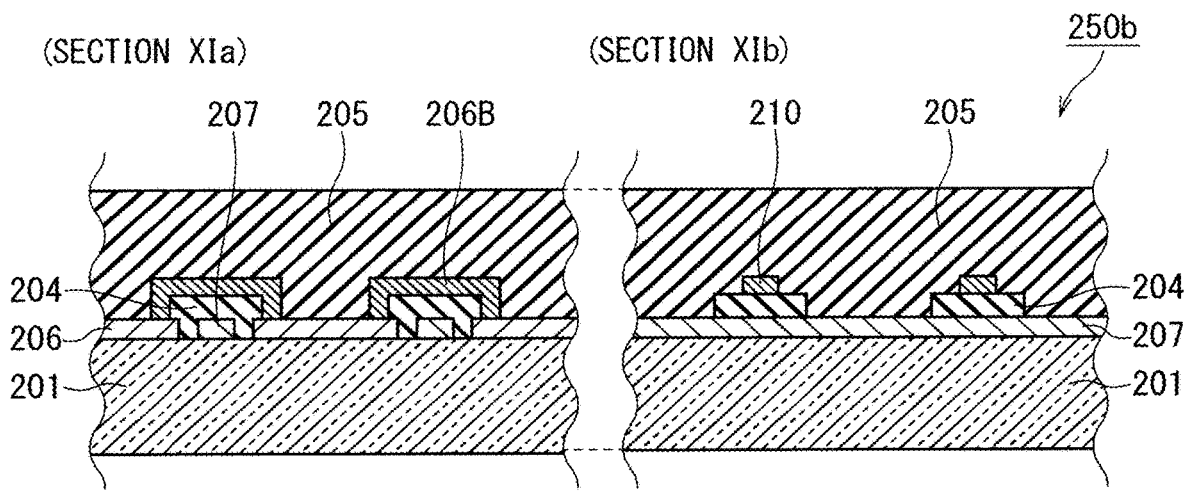
FIG. 11 is a partial sectional view taken along lines XIa-XIa and XIb-XIb in FIG. 10.

FIG. 10 is a plan view illustrating a touch screen 250b using a capacitive sensing method, as a second example of the touch screen 250 (FIG. 2). FIG. 11 is a partial sectional view taken along lines XIa-XIa and XIb-XIb in FIG. 10. In the present example, a so-called diamond structure is employed.

Row-direction wiring layers 206 and column-direction wiring layers 207 are disposed in the same layer. Each column-direction wiring layer 207 includes a plurality of diamond-shaped electrodes connected to one another and serving as the detection, electrodes 203. Each row-direction wiring layer 206 includes a plurality of diamond-shaped electrodes spaced from one another and serving as the excitation electrodes 202, and bridges 206B that electrically connect adjacent diamond-shaped electrodes. An interlayer insulation layer 204 is disposed so as to provide isolation between the bridges 206B and the column-direction wiring layers 207. Note that the bridge structure may be employed for the column-direction wiring layers, not for the row-direction wiring layers. Since the electrical resistance of the wiring layers tends to be increased by the formation of the bridges, the bridge structure is preferably employed for the shorter ones of the column-direction wiring layers and the row-direction wiring layers.

As the material for the row-direction wiring layers 206 and the column-direction wiring layers 207, a transparent conductive film such as indium tin oxide (ITO) is used, for example. Since ITO has light transmission properties, the possibility of the wiring layers being visually identified by a user can be reduced. The transparent conductive film such as ITO has a relatively high electrical resistance and is thus suitable for use in small-sized touch screens in which wiring resistance is not a problem. In addition, since wiring made of the transparent conductive film such as ITO is easily disconnected due to corrosion caused with other metal wiring, consideration has to be given to moisture resistance and water resistance in order to prevent corrosion.

While the above description is given regarding a case where the touch screen structure and the display panel structure are independent of each other, these structures may be inseparably integrated with each other. For example, in the case of a so-called on-cell touch panel, the touch screen is formed directly on the substrate of the display panel 300 (typically, a color filter substrate) without using the substrate 201. In the case of a so-called in-cell touch panel, the touch screen is formed between the two transparent insulating substrates (not shown) included in the display panel 300.

Tactile Presentation Panel

Figure 12:
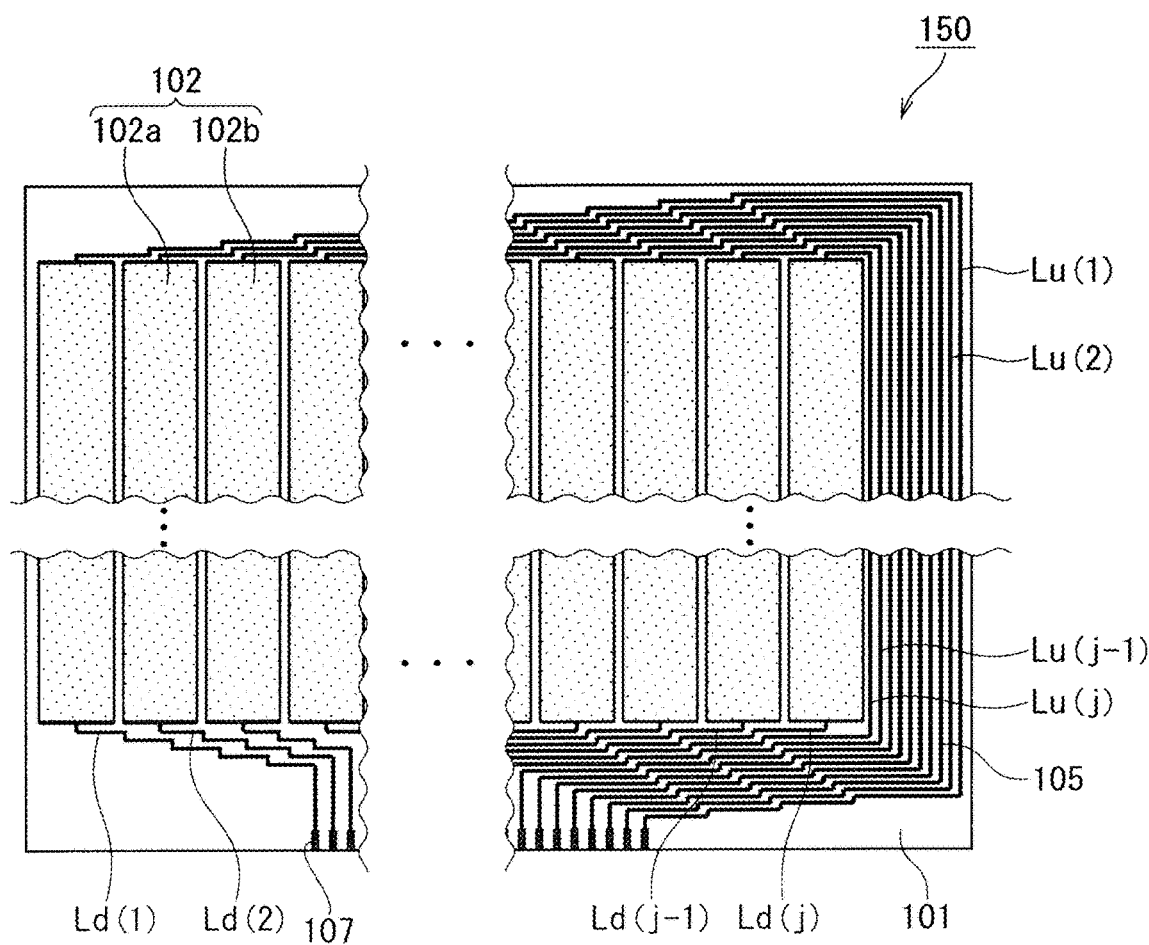
FIG. 12 is a plan view schematically illustrating a configuration of a tactile presentation screen in FIG. 2.

FIG. 12 is a plan view schematically illustrating a configuration of the tactile presentation screen 150. FIG. 13 is a schematic diagram for describing the formation of the electrostatic capacitances $C_{FE}$ between the tactile electrodes 102 and the indicator 2.

As described previously, the tactile presentation screen 150 includes the transparent insulating substrate 101, the tactile electrodes 102, and the dielectric layer 106. Also, a tactile presentation panel terminal area 107 is provided in the edge portion of the transparent insulating substrate 101, and a plurality of lead wiring layers 105 are disposed on the transparent insulating substrate 101. The dielectric layer 106 is provided so as to expose the tactile presentation panel terminal area 107. The tactile electrodes 102 are connected to the tactile presentation panel terminal area 107 via the lead wiring layers 105. The tactile presentation panel terminal area 107 is connected to the voltage supply circuit 110 (FIG. 2) via the FPC 108 (FIG. 1). The details of the lead wiring layers 105 will be described later.

Each tactile electrode 102 extends in an extension direction (longitudinal direction in FIG. 12). The tactile electrodes 102 are aligned with an interval therebetween in an alignment direction (lateral direction in FIG. 12). In the illustrated example the transparent insulating substrate 101 has a rectangular shape having long and short sides, and the tactile presentation screen 150 correspondingly has long and short sides. In the illustrated example, the alignment direction is along the long sides. If the horizontal direction viewed by an observer of the tactile presentation screen 150 is along the long sides, the aforementioned alignment direction is along the horizontal direction.

As larger electrostatic capacitances $C_{FE}$ are formed between the tactile electrodes 102 and the indicator 2, a stronger tactile sensation can be presented. From this viewpoint, the area of the tactile electrodes 102 is preferably as large as possible. In the case where the size of the area of the tactile electrodes 102 is given priority, it is difficult to make the tactile electrodes 102 visually less identified by giving a fine structure to the tactile electrodes 102. The tactile electrodes 102 may be formed of a transparent conductive film in order to make the tactile electrodes 102 visually less identified while increasing the area of the tactile electrodes 102. A typical example of the material for the transparent conductive film is ITO. A transparent conductive film such as ITO has a relatively high electrical resistance and is thus suitable for use in small-sized touch screens in which wiring resistance is not a problem. In addition, since the transparent conductive film such as ITO is easily disconnected due to corrosion caused with other metal wiring, consideration has to be given to moisture resistance and water resistance in order to prevent corrosion.

Instead of using the transparent conductive film as described above, the tactile electrodes 102 may be electrode (hereinafter, also referred to as "metal-film-containing electrodes") that are formed of a monolayer metal film or a multilayer metal film or that have a multilayer structure including either a monolayer metal film or a multilayer metal film and further including another conductive material. Preferable examples of the metal are those having low resistance such as aluminum or silver. Wiring resistance can be reduced by using the metal-film-containing electrodes. On the other hand, the metal film is opaque and easy to visually identified. In order to make the metal film visually less identified, the metal-film-containing electrodes may have a fine structure. The fine structure typically has a mesh shape.

The dielectric layer 106 is formed of a monolayer or multilayer organic insulation film, or a monolayer or multilayer inorganic insulation film. In the case of a multilayer film, different types of organic insulation films may be stacked, or different types of inorganic insulation films may be stacked, or an organic insulation film and an inorganic insulation film may be stacked. The inorganic insulation films have high moisture impermeability, high hardness, and high wear resistance. Since the indicator 2 slides on the dielectric layer 106, the dielectric layer 106 has high wear resistance. The organic insulation films are preferable for obtaining high flatness, but has low hardness and low wear resistance. Thus, in order to achieve both high flatness and high wear resistance, it is preferable that an inorganic insulation film is formed on an organic insulation film. Examples of the inorganic insulation films that can be used include transparent silicon-based inorganic insulation films such as a silicon oxide film, a silicon nitride film, and a silicon oxy-nitride film; and transparent inorganic insulation films formed of metal oxides such as alumina. Examples of the material that can be used for the organic insulation films include polymeric materials that have a main chain formed of a silicon oxide, a silicon nitride film, or a silicon oxy-nitride film and that have a side chain or functional group coupled to an organic substance; and thermosetting resins having a main carbon chain. Examples of the resins that can be used include acrylic resins, polyimide resins, epoxy resins, novolac resins, and olefin resins.

The electrostatic capacitance $C_{FE}$ can be expressed by the following equation:

$$C_{FE} = Q/V = \varepsilon S/d$$

where Q is the amount of charge stored in each of the indicator 2 and the tactile electrodes 102, V is the voltage between the indicator 2 and the tactile electrodes 102, $\varepsilon$ is the permittivity of the dielectric layer 106, S is the area of contact between the indicator 2 and the tactile electrodes 102 via the dielectric layer 106, and d is the thickness of the dielectric layer 106. The electrostatic capacitance $C_{FE}$ is proportional to the permittivity E and is inversely proportional to the film thickness d.

It can be noted from the above equation that the permittivity E is preferably high in order to increase the electrostatic capacitance $C_{FE}$. Specifically, it is preferable for the dielectric layer 106 to include a film having a relative permittivity of 10 or more (hereinafter, also referred to as a "high permittivity insulation film"). In the high permittivity insulation film, a situation occurs in which positive and negative charges are displaced in the material due to an electric field applied from outside (which situation is generally called "dielectric polarization"). This dielectric polarization is such that charges induced by polarization (generally called "polarization charges") are maintained while the voltage is held; when the voltage drops, the polarization charges decrease and the dielectric polarization is lessened; and when the applied voltage becomes zero volts, dielectric polarization disappears. The direction of the dielectric polarization can be changed by the electric field. The high permittivity insulation film may be used as a monolayer, or may be used as a multilayer film by stacking with another inorganic or organic insulation film having a low permittivity or another high permittivity insulation film. Ordinarily, given that the refractive index increases as the permittivity increases, a stacked structure including a film with a high refractive index and a film with a low refractive index can be obtained by stacking a high permittivity insulation film and a low permittivity insulating film. This stacked structure allows the dielectric layer 106 to also function as an anti-reflective film.

It can also be noted from the above equation that the thickness d is preferably small in order to increase the electrostatic capacitances $C_{FE}$. If a high permittivity insulation film and an organic insulation film are stacked, it is possible to reduce the thickness of the organic insulation film while ensuring sufficient insulating properties. Accordingly, the thickness d of the dielectric layer 106 can be reduced.

If the tactile electrodes have a matrix structure as disclosed in Japanese Patent Application Laid-Open No. 2015-097076 described above (i.e. a structure including X- and Y-electrodes that intersect with one another), a difference in level, i.e., asperities, are generated at the intersections of the X- and Y-electrodes. These irregularities may be flattened if the insulation layer covering the asperities has a great thickness, but there is a limit to increasing the thickness of the insulation layer from the viewpoint of avoiding an excessive reduction of the electrostatic capacitances $C_{FE}$. Therefore, asperities may be generated on the front-side surface of the tactile presentation screen. If the sense of texture of these asperities is mixed with the sense of texture produced by the static electric force from the tactile electrodes, it becomes difficult to give an intended sense of texture to the user. In the case where an organic insulation film having the effect of flattening the surface shape is used as the dielectric layer 106, the aforementioned generation of asperities may be avoided, but a certain degree of thickness is required to flatten the surface and the reduction of the electrostatic capacitances $C_{FE}$ is unavoidable.

In contrast, according to the present embodiment, the tactile electrodes 102 have no intersections, and therefore the sizes of asperities can be reduced down to approximately the thickness of the tactile electrodes 102. This enables reducing the thickness of an organic film having a flattening effect or applying a high permittivity insulation film having a low flattening effect. Accordingly, it is possible to increase the electrostatic capacitances $C_{FE}$ more than in the case of a matrix structure.

Even with the same electrostatic capacitance $C_{FE}$, if the indicator 2 can easily slide on the dielectric layer 106, the user can easily perceive a change in the static electric force between the indicator 2 and the tactile electrodes 102 as a change in frictional force. In this case, a stronger tactile sensation can be given to the user. In order to facilitate the sliding of the indicator 2 on the dielectric layer 106, it is necessary to reduce adhesion between the dielectric layer 106 and the indicator 2. To achieve this, for example, a film having higher water repellency than the interior of the dielectric layer 106 may be provided on the outermost surface of the dielectric layer 106.

Electrode Pitch

Figure 14:
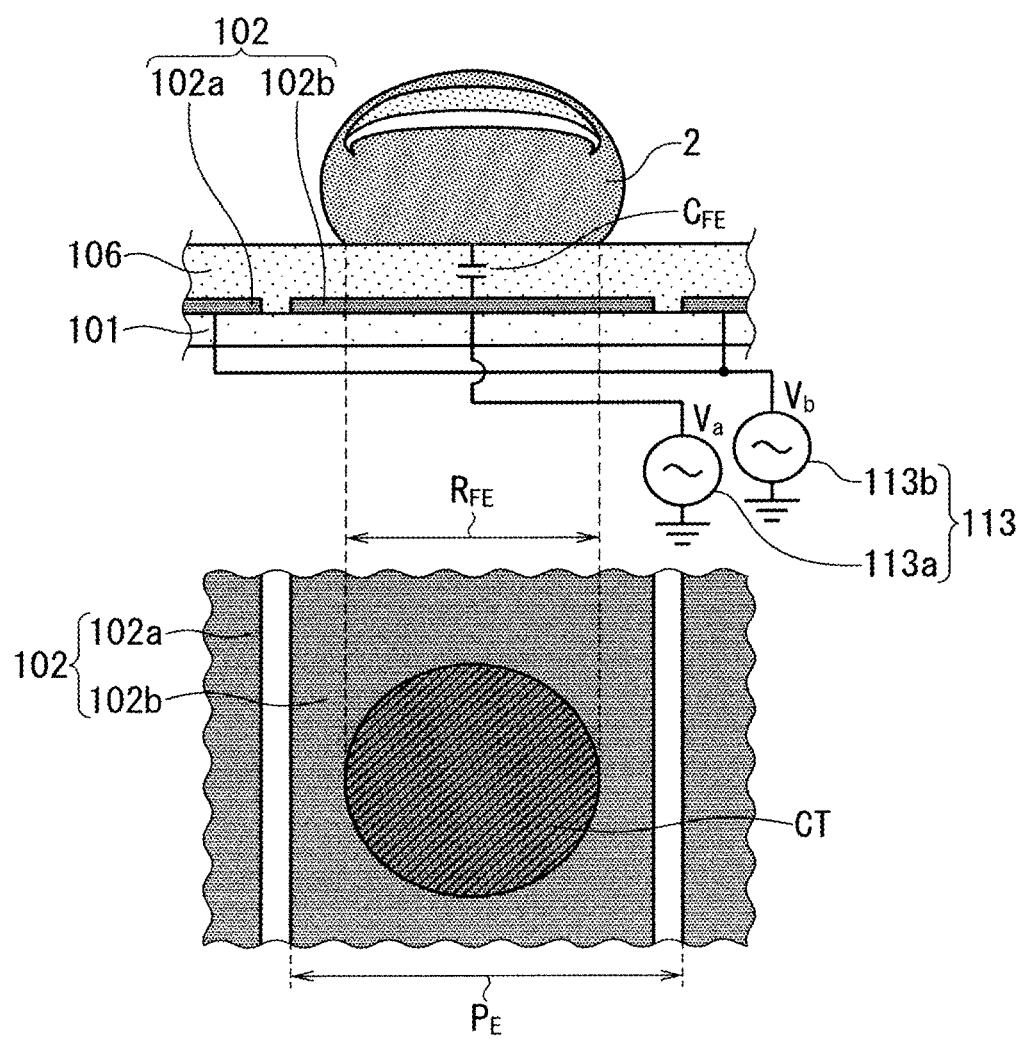
FIG. 14 is a schematic diagram for describing the formation of the electrostatic capacitances between the tactile electrodes and the indicator when the pitch of the tactile electrodes on the tactile presentation panel in FIG. 2 is greater than a contact diameter.

FIG. 14 is a schematic diagram for describing the formation of the electrostatic capacitances $C_{FE}$ between the tactile electrodes 102 and the indicator 2 when the pitch $P_E$ of the tactile electrodes 102 is greater than the diameter $R_{FE}$. FIG. 15 is a schematic diagram for describing the formation of the electrostatic capacitances $C_{FE}$ between the tactile electrodes 102 and the indicator 2 when the pitch $P_E$ of the tactile electrodes 102 is smaller than the diameter $R_{FE}$.

In the present embodiment, as described previously, the static electric force corresponding to the amplitude modulating signal $V_F$ (FIG. 7) is generated by applying frequencies to the adjacent first and second electrodes 102a and 102b. Accordingly, the frictional force between the dielectric layer 106 and the indicator 2 changes in accordance with the beat frequency of the amplitude modulating signal $V_F$, and the user perceives this change as a tactile sensation. In the situation illustrated in FIG. 14, only the voltage signal $V_a$ acts on the indicator 2, and the voltage signal $V_b$ does not act on the indicator 2. Thus, the amplitude modulating signal $V_F$ is not generated and accordingly no tactile sensation is created. On the other hand, when the indicator 2 has moved to a position above the boundary between the first and second electrodes 102a and 102b, a tactile sensation is created. Therefore, in the configuration in FIG. 14, the user tends to perceive a discontinuous tactile sensation. In contrast, in the situation illustrated in FIG. 15, both of the voltage signals $V_a$ and $V_b$ act on the indicator 2 irrespective of the position of the indicator 2, and the amplitude modulating signal $V_F$ is thereby generated. Therefore, in the configuration in FIG. 15, the user tends to perceive a continuous tactile sensation.

The indicator 2 is usually a human finger. The contact surface CT when a fingertip has touched a touch panel or the like is generally said to correspond to a circle with a diameter of approximately 7 mm, and typical industry standards for touch panels are defined according to about this dimension. Therefore, if the tactile electrodes 102 are arranged at a pitch $P_E$ less than or equal to 7 mm, the finger serving as the indicator 2 can always touch both of adjacent first and second electrodes 102a and 102b.

Figure 16:
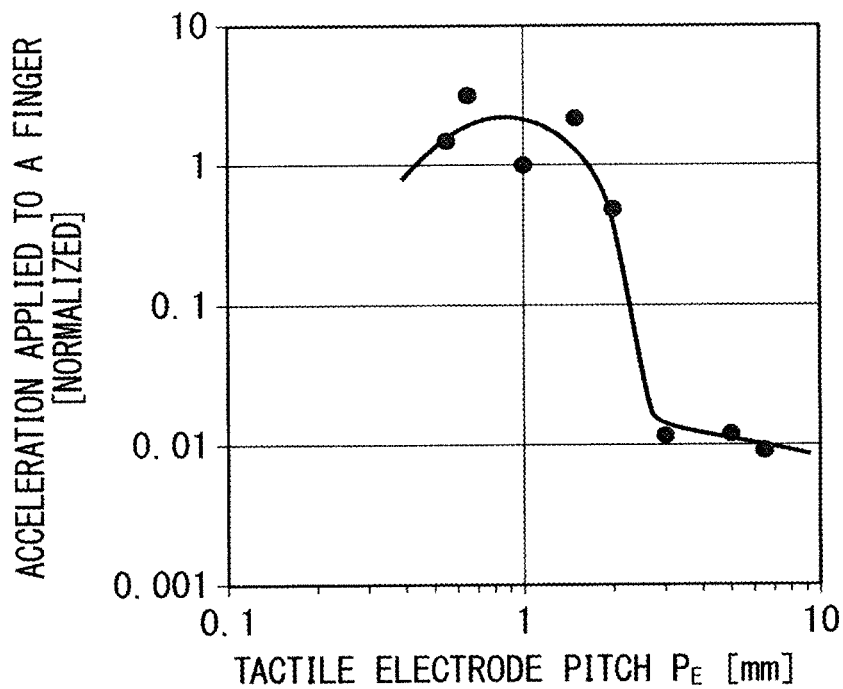
FIG. 16 is a graph illustrating an example of the relationship between the pitch of the tactile electrodes on the tactile presentation panel in FIG. 2 and the acceleration applied to a finger that serves as the indicator.

FIG. 16 is a graph showing the result of experiments on the relationship between the pitch $P_E$ of the tactile electrodes 102 and accelerations applied to the finger serving as the indicator 2 that slides on the dielectric layer 106. The pitches $P_E$ ranging from 0.5 mm to 6.5 mm were considered. Significant accelerations were observed throughout the range. Great accelerations were observed particularly when the pitch $P_E$ was less than or equal to 2 mm. It has also been found that remarkably great accelerations occur if the pitch $P_E$ is at least greater than or equal to 0.5 mm. Note that it is presumed possible to use pitches $P_E$ less than 0.5 mm.

As experimental conditions, the acceleration on the vertical axis was measured by an acceleration sensor attached to the nail of the finger that slides on the dielectric layer 106. Also, the voltage signal $V_a$ with a voltage of 50V and a frequency of 7 kHz and the voltage signal $V_b$ with a voltage of 50V and a frequency of 7.2 kHz were used.

Note that the pitch $P_E$ of the tactile electrodes 102 can be selected independently of the pitches of the excitation electrodes 202 and the detection electrodes 203 on the touch panel 200. Accordingly, the pitch $P_E$ may be selected so as to suppress moiré caused by optical interference between the tactile electrodes 102 and the electrodes excitation electrodes 202 and detection electrodes 203) on the touch panel 200.

Interelectrode Distance

In the case where the surface of the tactile presentation panel 100 has asperities arising from the thickness of the electrodes, the indicator 2 vibrates due to these surface asperities when the indicator 2 slides in contact with the tactile electrodes 102 via the dielectric layer 106. These vibrations will be sensed by the indicator 2, irrespective of the voltage signals applied to the tactile electrodes 102. This consequently makes it difficult for the indicator 2 to perceive a tactile sensation obtained by the voltage signals. In other words, sensitivity to tactile sensations may be reduced.

Even if the tactile presentation panel 100 has surface asperities, whether the indicator 2 is sensitive to the surface asperities or not depends on the interelectrode interval between the tactile electrodes 102 as will be described later. As the permissible size of asperities increases, the necessity of increasing the thickness of the dielectric layer 106 to reduce asperities decreases. That is, it becomes allowable to reduce the thickness of the dielectric layer 106. This increases the capacitances formed between the indicator 2 and the tactile electrodes 102. Accordingly, a stronger tactile sensation can be created.

Figure 17:
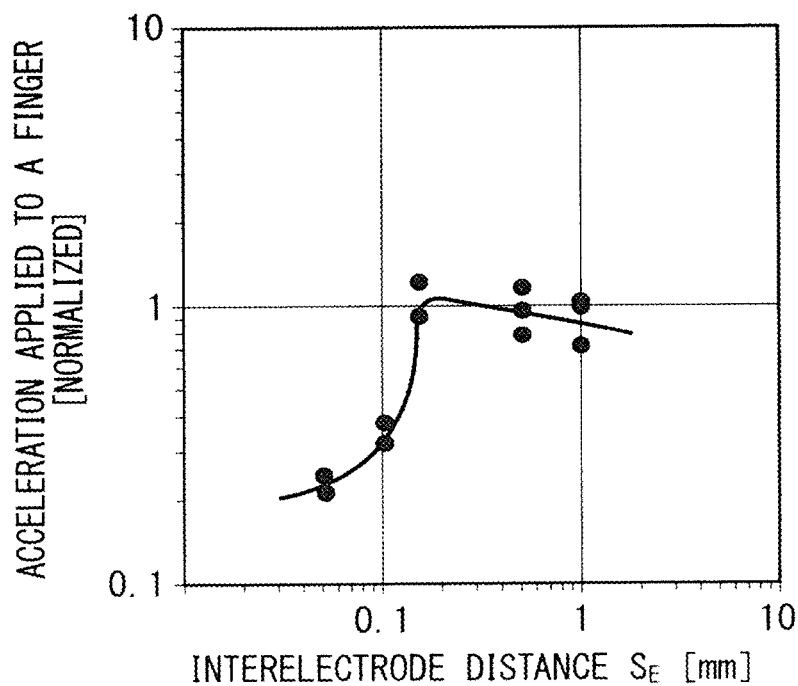
FIG. 17 is a graph showing an example of the relationship between the interelectrode distance of the tactile electrodes and vibrations (acceleration) of the indicator when the indicator slides on the tactile electrodes via a dielectric layer.

FIG. 17 is a graph showing an example of the relationship between the vibrations of the indicator 2 (acceleration) and the interelectrode distance $S_E$ of the tactile electrodes 102 when the indicator 2 slides on the tactile electrodes 102 via the dielectric layer 106. Here, the interelectrode distance $S_E$ is defined as a minimum interelectrode distance between the tactile electrodes 102. According to Embodiment 1 of the present invention, the interelectrode distance $S_E$ corresponds to the distance between electrodes in a direction perpendicular to the extension direction of the linearly extending tactile electrodes 102. Compared to the case where the interelectrode distance $S_E$ is approximately greater than or equal to 0.2 mm, when the interelectrode distance $S_E$ is less than or equal to 0.1 mm, the vibrations of the indicator 2 are reduced to one-third or less. Accordingly, the sensitivity to tactile sensations can be improved by setting the interelectrode distance $S_E$ to be less than or equal to 0.1 mm.

On the surface of a finger serving as the indicator 2, fingerprints including superfine projections and depressions are present, the projections and depressions being respectively called ridges and valleys. When the ridges of the fingerprints fit in depressions in the surface of the tactile presentation panel 100, a reaction force of contact takes on a maximum value. Correspondingly, a tactile receptor provides a stimulus called an "impulse" in response to a stress concentration at the skin in the vicinity of the ridges. When this stimulus is transmitted to the brain, a tactile sensation is sensed. It is conceivable that if the interelectrode distance $S_E$ is smaller than the width of the valleys of the fingerprints, the influence of the fingerprints on the vibrations of the indicator 2 will be reduced because the ridges of the fingerprints are less likely to fit in depressions of the surface of the tactile presentation panel 100. In general, it can be said that the heights of the ridges and valleys of average fingerprints are approximately in the range of 0.05 mm to 0.1 mm, the interval of the ridges is approximately in the range of 0.3 mm to 0.5 mm, and the width of the valleys are approximately 0.1 mm. As described above, the acceleration applied to the finger remarkably decreases when the interelectrode distance $S_E$ is less than or equal to 0.1 mm. This is considered because the interelectrode distance $S_E$ is smaller than the width of the valleys of the fingerprints, i.e., approximately 0.1 mm.

Detailed Configuration of Tactile Presentation Touch Panel

Figure 18:
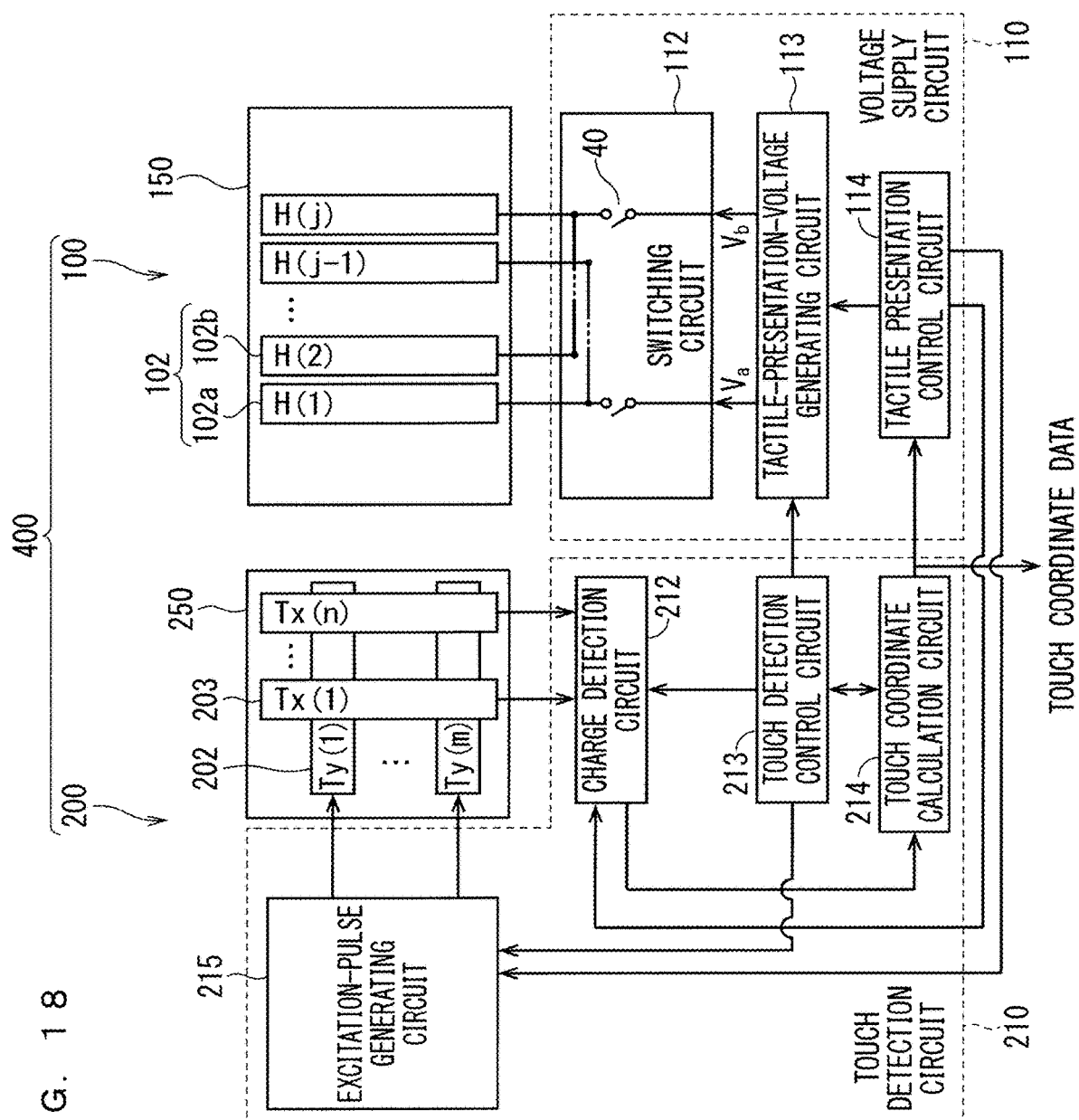
FIG. 18 is a block diagram schematically illustrating a configuration of the tactile presentation touch panel in FIG. 1.

FIG. 18 is a block diagram schematically illustrating a configuration of the tactile presentation touch panel 400. It is assumed here that excitation electrodes Ty(1) to Ty(m) are provided as the excitation electrodes 202, detection electrodes Tx(1) to Tx(n) are provided as the detection electrodes 203, and tactile electrodes H(1) to H(j) are provided as the tactile electrodes 102. The tactile electrodes H(1) to H(j) are aligned in order of the number inside the parentheses, with odd-numbered electrodes corresponding to the first electrodes 102a and even-numbered electrodes corresponding to the second electrodes 102b. To simplify the description, a single row-direction wiring layer 206 (FIG. 8 or FIG. 10) includes a single excitation electrode 202, and a single column-direction wiring layer 207 (FIG. 8 or 10) includes a single detection electrode 203.

As described previously, the tactile presentation touch panel 400 includes the touch panel 200 and the tactile presentation panel 100. The touch panel 200 includes the touch screen 250 and the touch detection circuit 210. The tactile presentation panel 100 includes the tactile presentation screen 150 and the voltage supply circuit 110.

The touch detection circuit 210 includes an excitation-pulse generating circuit 215, a charge detection circuit 212, a touch coordinate calculation circuit 214, and a touch detection control circuit 213. The touch detection control circuit 213 controls operations of the excitation-pulse generating circuit 215, the charge detection circuit 212, and the touch coordinate calculation circuit 214. The excitation-pulse generating circuit 215 applies excited pulse signals in orderly sequence to the excitation electrodes Ty(1) to Ty(m). The charge detection circuit 212 measures signals obtained from the detection electrodes Tx(1) to Tx(n). The charge detection circuit 212 thereby detects the amount of charge stored in each of the detection electrodes Tx(1) to Tx(n). Information about the charge detection result indicates a value that corresponds to a mutual capacitance between an excitation electrode Ty(k) and each of the detection electrodes Tx(1) to Tx(n) when an excited pulse signal is given to the excitation electrode Ty(k), where k is an integer greater than or equal to 1 and less than or equal to m. The charge detection circuit 212 is capable of recognizing which of the excitation electrodes Ty(1) to Ty(m) have received application of excited pulse signals in response to the control signal from the touch detection control circuit 213. On the basis of the aforementioned charge detection result, the touch coordinate calculation circuit 214 obtains data about the coordinates of a position touched by the indicator 2 (hereinafter referred to as "touch coordinate data"). The touch coordinate data is output to the outside of the tactile presentation touch panel 400 and also output to the voltage supply circuit 110 of the tactile presentation panel 100.

The voltage supply circuit 110 includes a switching circuit 112, a tactile-presentation-voltage generating circuit 113, and a tactile presentation control circuit 114. The tactile-presentation-voltage generating circuit 113 applies the voltage signal $V_a$ to those of the tactile electrodes H(1) to H(j) that corresponds to the first electrodes 102a and applies the voltage signal $V_b$ to those of the tactile electrodes H(1) to H(j) that correspond to the second electrodes 102b via the switching circuit 112. In other words, the voltage signals $V_a$ and $V_b$ are alternately applied to the tactile electrodes H(1) to H(j) aligned in one direction (lateral direction in FIG. 18). The switching circuit 112 is turned on or off in response to a command from the tactile-presentation-voltage generating circuit 113. In the ON state, the switching circuit 112 connects the tactile electrodes 102 to the tactile-presentation-voltage generating circuit 113. In the OFF state, the switching circuit 112 causes the tactile electrodes 102 to enter a floating state. In the present embodiment, the switching circuit 112 includes two switches 40, one of the switches performing switching of electrical paths to all of the first electrodes 102a, and the other switch performing switching of electrical paths to all of the second electrodes 102b. These two switches 40 may be controlled in conjunction with each other.

The tactile presentation control circuit 114 references information about the touch coordinate data detected by the touch detection circuit 210. The tactile presentation control circuit 114 may use this information as a basis to control the operation of the tactile-presentation-voltage generating circuit 113.

Operations of Tactile Presentation Touch Panel

Figure 19:
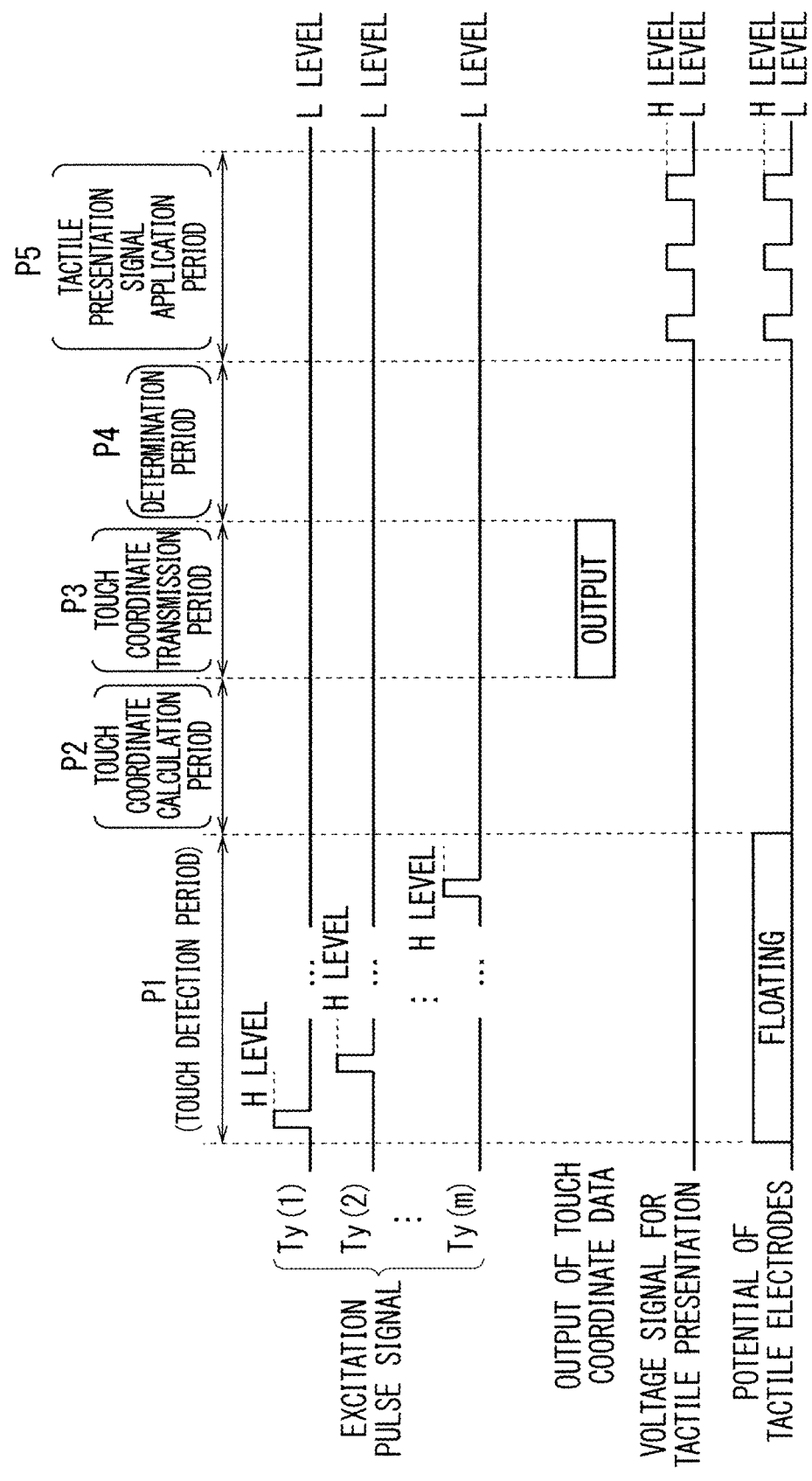
FIG. 19 is a timing chart schematically illustrating the timings of operations of the tactile presentation touch panel in FIG. 1.

FIG. 19 is a timing chart schematically illustrating operational timings of the tactile presentation touch panel 400 (FIG. 18).

First, during a touch detection period P1, a control signal indicating a first conversion timing is output from the touch detection control circuit 213 to the excitation-pulse generating circuit 215. Upon receiving this control signal, the excitation-pulse generating circuit 215 gives an excited pulse signal (charge pulse signal) to the excitation electrode Ty(1). In this way, an interelectrode capacitance (mutual capacitance) between the excitation electrode Ty(1) and each of the detection electrodes Tx(1) to Tx(n) that intersect with the excitation electrode Ty(1) in plan view is charged. The charge detection circuit 212 detects the amount of charge obtained by the above charging, using the detection electrodes Tx(1) to Tx(n). The charge detection circuit 212 then performs an analog/digital conversion (A/D conversion) on that detection result, and outputs obtained digital information to the touch coordinate calculation circuit 214 as a charge detection result on the mutual capacitance corresponding to the excitation electrode Ty(1). Similarly, control signals indicating the second to m-th conversion timings are output in orderly sequence from the touch detection control circuit 213 to the excitation-pulse generating circuit 215. In response to each of the second to m-th conversion timings, the charge detection result on the mutual capacitance corresponding to each of the excitation electrodes Ty(2) to Ty(m) is output to the touch coordinate calculation circuit 214.

The touch detection control circuit 213 also outputs the above control signals to the tactile-presentation-voltage generating circuit 113. On the basis of these control signals, the tactile-presentation-voltage generating circuit 113 can recognize the touch detection period P1. During the touch detection period P1, the tactile-presentation-voltage generating circuit 113 shuts off the switches 40 of the switching circuit 112. This shuts off the electrical connection between the tactile-presentation-voltage generating circuit 113 and all of the tactile electrodes 102. As a result, all of the tactile electrodes 102 are set to a floating potential.

Next, during a touch coordinate calculation period P2, the touch coordinate calculation circuit 214 determines whether the indicator 2 has touched the panel, on the basis of the charge detection results on the mutual capacitance corresponding to each of the excitation electrodes Ty(1) to Ty(m), or in other words, the charge detection results on the capacitances at all the intersections formed by the excitation electrodes Ty(1) to Ty(m) and the detection electrodes Tx(1) to Tx(n), the charge detection results having been stored after input from the charge detection circuit 212. As a result of the coupling of electric fields between the excitation electrodes 202 and the detection electrodes 203 being alleviated by the approach or contact of the indicator 2 such as a finger, the electric charges at the mutual capacitances decrease. On the basis of the degree of this decrease, the touch coordinate calculation circuit 214 can determine the presence or absence of a touch. If it is determined that a touch has been made, the touch coordinate calculation circuit 214 starts the calculation of touch coordinate data on the basis of the aforementioned charge detection results. Specifically, the touch coordinate calculation circuit 214 can calculate the touch coordinate data by performing computational processing such as gravity computation on the detection results for the intersection showing the greatest degree of decrease in electric charge and for surrounding intersections. If it is determined that a touch has not been made, touch coordinate data is not calculated, and the procedure returns to the touch detection period P1. In order to enable this processing, the touch coordinate calculation circuit 214 gives a signal indicating the result of determining the presence or absence of a touch to the touch detection control circuit 213.

Next, during a touch coordinate transmission period P3, the touch coordinate calculation circuit 214 outputs the touch coordinate data to the outside of the tactile presentation touch panel 400 and to the voltage supply circuit 110 of the tactile presentation panel 100 in accordance with a touch-coordinate-data sending timing received from the touch detection control circuit 213.

Next, during a determination period P4, the tactile presentation control circuit 114 determines whether the touch coordinate data falls within a tactile presentation coordinate range. The "tactile presentation coordinate range" typically include coordinates that are set in advance before the above determination, and is stored inside or outside the tactile presentation control circuit 114.

When the touch coordinate data falls within the tactile presentation coordinate range, the tactile presentation control circuit 114 selects a tactile presentation signal waveform that corresponds to the touch coordinates. This "tactile presentation signal waveform" defines the waveforms of the voltage signals $V_a$ and $V_b$. Note that a difference in waveform between the voltage signals $V_a$ and $V_b$ is typically a difference in frequency. The tactile presentation signal waveform is set inside or outside the tactile presentation control circuit 114. The number of types of the tactile presentation signal waveform may be one or more than one. In the case where there is only one type of tactile presentation signal waveform, processing for selecting the tactile presentation signal waveform is unnecessary. In the case where there are one or more types of tactile presentation signal waveforms, typically a plurality of tactile presentation coordinate regions corresponding to each type are set in advance, and the type of the tactile presentation signal waveform is selected depending on the region in which the touch coordinates are included.

Next, during a tactile presentation signal application period P5, the tactile presentation control circuit 114 generates a tactile presentation signal of the above tactile presentation signal waveform. Also, the switches 40 of the switching circuit 112 are turned on. Thus, the signal is applied to the tactile electrodes 102, and a tactile sensation is thereby presented. In the example in FIG. 19, pulse signals having a high level (H level) and a low level (L level) are applied to the tactile electrodes 102. The tactile electrodes 102 are charged to a high voltage, typically several tens of volts, during an H level period, and discharged during an L level period. The cycle and period of generation of the pulse signals may be appropriately set according to a tactile sensation desired to be given.

After the aforementioned tactile presentation signal application period P5, the procedure returns to the touch detection period P1. Then, the aforementioned operations are repeated. In this way, the tactile presentation touch panel 400 can detect a touch position and present a tactile sensation according to the touch, position.

Figure 20:
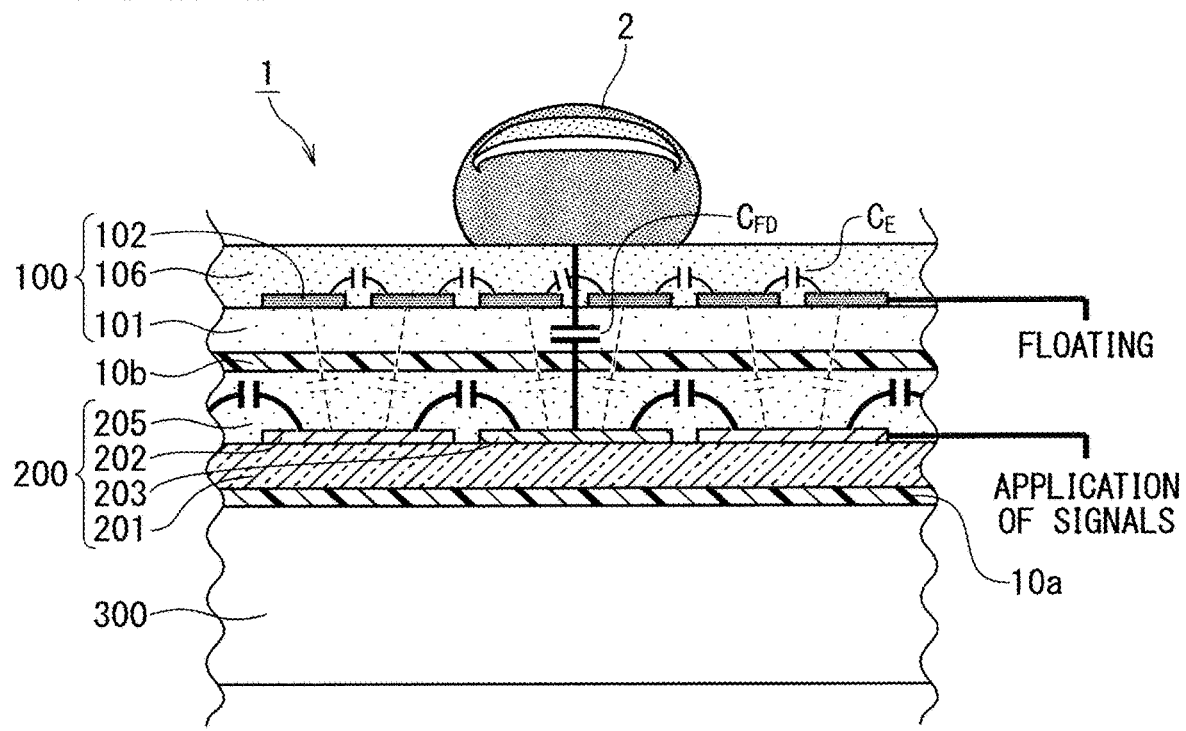
FIG. 20 is a schematic diagram illustrating how electrostatic capacitances are fainted in the tactile presentation touch panel when the touch panel in FIG. 18 detects a touch position.

FIG. 20 is a schematic diagram illustrating how electrostatic capacitances are formed in the tactile presentation touch panel 400 during the touch detection period P1 (FIG. 19). During the touch detection period P1, an electrostatic capacitance $C_{FD}$ is formed between the indicator 2 and a detection electrode 203. During this period, all of the tactile electrodes 102 are held at a floating potential. This avoids a situation where the tactile electrodes 102 function as shields. Accordingly, it is possible to improve sensitivity to touch detection.

Figure 21:
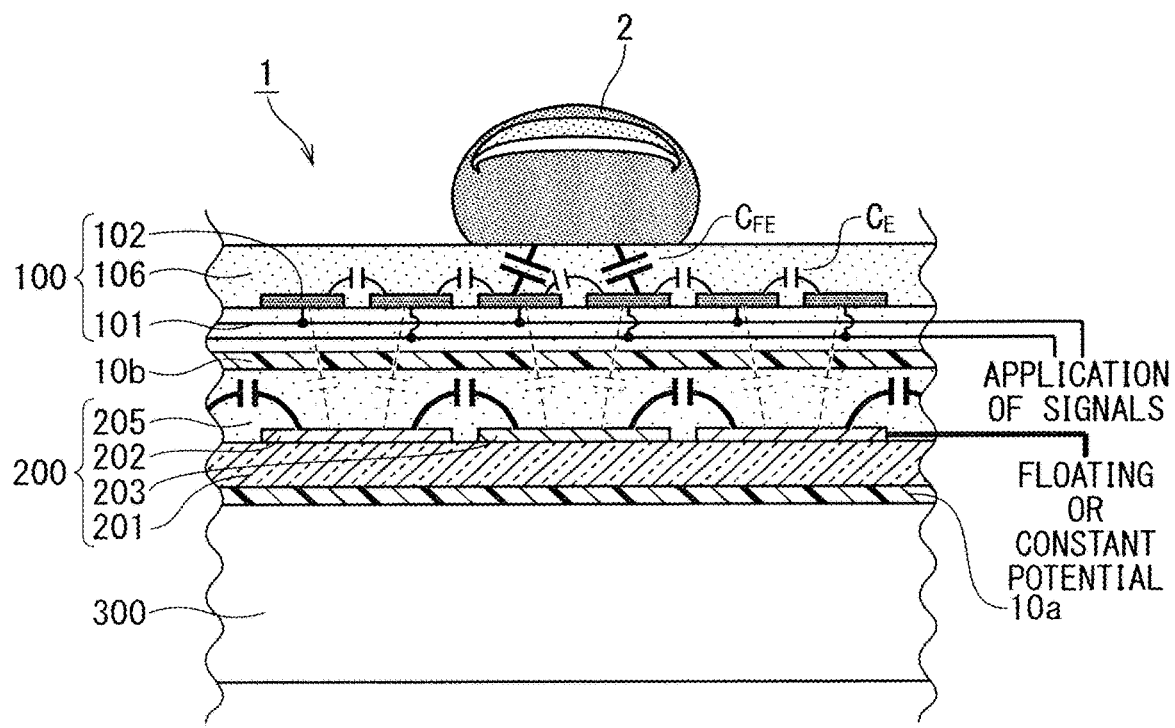
FIG. 21 is a schematic diagram illustrating how electrostatic capacitances are formed in the tactile presentation touch panel when the tactile presentation panel in FIG. 18 creates a tactile sensation.

FIG. 21 is a schematic diagram illustrating how electrostatic capacitances are formed in the tactile presentation touch display 1 during the tactile presentation signal application period P5 (FIG. 19). During the tactile presentation signal application period P5, the excitation electrodes 202 and the detection electrodes 203 on the touch panel 200 may be held at a floating potential. This reduces the influence that the formation of capacitances by the excitation electrodes 202 and the detection electrodes 203 have on the electrostatic capacitance $C_{FE}$. Alternatively, the potentials of the excitation electrodes 202 and the detection electrodes 203 on the touch panel 200 may be, set to substantially a constant potential, and for example, the excitation electrodes 202 and the detection electrodes 203 may be connected to a ground potential at low impedance. In this case, the excitation electrodes 202 and the detection electrodes 203 can function as shields between the tactile electrodes 102 and the display panel 300. This suppresses the generation of noise in the display panel 300 due to high-voltage signals applied to the tactile electrodes 102. Accordingly, it is possible to prevent display problems caused by noise. Conversely, it is also possible to suppress the generation of noise in the tactile electrodes 102 due to the display panel 300.

In the case of using a floating state, both of the excitation electrodes 202 and the detection electrodes 203 may enter a floating state, or either of them may enter a floating state. In the case of using a constant potential, both of the excitation electrodes 202 and the detection electrodes 203 may be set to a constant potential, or either of them may be set to a constant potential. Alternatively, either of the excitation electrodes 202 and the detection electrodes 203 may enter a floating state, and the other may be set to a constant potential. In the case where the excitation electrodes 202 and the detection electrodes 203 have different distances to the tactile electrodes 102, either of the excitation electrodes 202 and the detection electrodes 203 that are closer to the tactile electrodes 102 may enter a floating state, and the other on the far side from the excitation electrode 202 may be set to a constant potential.

Although the touch coordinate data is transmitted from the touch detection circuit 210 to the voltage supply circuit 110 in the example illustrated in FIG. 18, as a variation, information about the charge detection results may be transmitted from the charge detection circuit 212 to the voltage supply circuit 110. In this case, the tactile presentation control circuit 114 determines the presence or absence of a touch and calculates touch coordinates, using the information about the charge detection results.

Difference in Electrode Structure Between Tactile Presentation Screen and Touch Screen As preferable conditions for the tactile electrodes 102, firstly, there is demand for a configuration in which the indicator 2 is capable of touching the tactile electrodes 102 without the intervention of a member other than the dielectric layer 106. Therefore, the tactile electrodes 102 covered with the dielectric layer 106 are preferably disposed on the outermost surface of the tactile presentation touch panel 400.

Secondly, a stronger tactile sensation can be created as the distance between the indicator 2 and the tactile electrodes 102 decreases. From this viewpoint, it is preferable for the dielectric layer 106 to have a small thickness and for the dielectric layer 106 to have a high permittivity.

Figure 22:
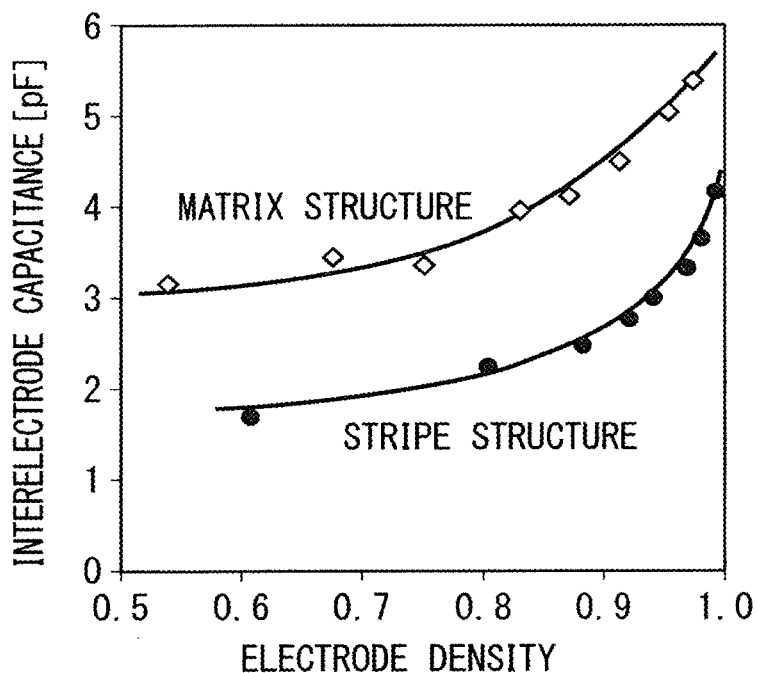
FIG. 22 is a graph illustrating simulation results of the relationship between the electrode density and each of electrostatic capacitances between tactile electrodes in a stripe structure according to an example of the present invention and electrostatic capacitances between tactile electrodes in a matrix structure according to a comparative example.

Thirdly, it is preferable that electrostatic capacitances $C_E$ between the tactile electrodes 102, i.e., interelectrode capacitances, are small in order not to inhibit the formation of the electrostatic capacitance $C_{FD}$ at the time of detecting a touch position (FIG. 20), although there is demand for the tactile electrodes 102 to be disposed densely in order to increase the electrostatic capacitances $C_{FE}$ (FIG. 21) at the time of creating a tactile sensation. Hereinafter, this points will be described in detail. FIG. 22 is a graph illustrating the result of simulations on the relationship between the density of electrodes (electrode density) and each of the electrostatic capacitances between the tactile electrodes 102 in a stripe structure according to an example of the present invention and the electrostatic capacitances between the tactile electrodes in a matrix structure according to a comparative example. In the stripe structure, the tactile electrodes 102 are provided in stripes as illustrated in FIG. 3. In contrast, in the matrix structure, the tactile electrodes intersect with one another as in the technique disclosed in Japanese Patent Application Laid-Open No. 2015-097076 described above. The electrode density represents the proportion of the tactile electrodes provided per unit area and is adjusted by changing the interval between adjacent electrodes. Compared to the matrix structure, the stripe structure can suppress interelectrode capacitances, irrespective of what electrode density is selected.

Fourthly, the application of a voltage for presenting a tactile sensation does not necessarily have to be performed only at a specific position on the tactile presentation screen 150 and may be performed in a region that includes a point touched by the indicator 2, as long as there is no need to selectively present a tactile sensation at one of a plurality of touch positions in the case of multiple touches. As the simplest configuration, the above region may be the whole tactile presentation enabled area on the tactile presentation screen 150. The present embodiment employs such a configuration. Specifically, the voltage supply circuit 110 (FIG. 18) applies the voltage signal $V_a$ simultaneously to all of the first electrodes 102a among the tactile electrodes 102 and applies the voltage signal $V_b$ simultaneously to all of the second electrodes 102b among the tactile electrodes 102. This eliminates the need for the configuration for selectively applying a voltage signal to some of the first electrodes 102a and a configuration for selectively applying a voltage signal to some of the second electrodes 102b.

As preferable conditions for the excitation electrodes 202 and the detection electrodes 203, firstly a matrix structure capable of accurately identifying a touch position is necessary in order to ensure linearity and sensitivity to touch position detection. Secondly, it is necessary to maintain a predetermined distance (several hundreds of micrometers or more and several millimeters or less) between the excitation electrodes 202 and the detection electrodes 203 in order to expand the electric field in the lateral direction, because the touch position is sensed by the electrostatic capacitances $C_{FD}$ formed by the indicator 2 and the detection electrodes 203 via the tactile presentation screen 150.

As described above, there is a difference in preferable conditions between the tactile electrodes 102 and the excitation and detection electrodes 202 and 203. To optimize both of the conditions, it is undesirable to employ similar structures for those electrodes.

Details of Lead Wiring Layers

The lead wiring layers 105 (FIG. 12) in the tactile presentation screen 150, specifically, include lead wiring layers Ld(1) to Ld(j) and lead wiring layers Lu(1) to Lu(j). Lead wiring layers Ld (k) and Lu(k) are each connected to the k-th tactile electrode 102, where k is an integer from 1 to j. The lead wiring layers Ld(k) and Lu(k) are connected respectively to one and the other ends of one tactile electrodes 102 in the extension direction.

From the viewpoint of preventing the touch detection by the touch screen 250 from being inhibited, it is desirable for each tactile electrode 102 on the tactile presentation screen 150 to have high wiring resistance, e.g., $10^4 \Omega$ or higher. When the tactile electrodes 102 have high wiring resistance in this way, a delay in propagation of the voltage signals is likely to occur in the wiring layers. However, the occurrence of such a delay in propagation can be suppressed by connecting the lead wiring layers 105 to the one and the other ends of the tactile electrodes 102 as described above.

The lead wiring layers Ld(1) to Ld(j) are disposed outside the tactile presentation enabled area and extend to their corresponding electrodes so as to achieve almost shortest distances from the tactile presentation panel terminal area 107 in order from one of the lead wiring layers Ld(1) to Ld(j) that is located closer to the center of alignment in the tactile presentation panel terminal area 107. The tactile presentation panel terminal area 107 is disposed along a long side of the transparent insulating substrate 101 in the vicinity of the center of the long side. The lead wiring layers Ld(1) to Ld(j) are disposed as densely as possible while ensuring mutual insulation. The lead wiring layers Lu(1) to Lu(j) are disposed in the same manner outside the region occupied by the lead wiring layers Ld(1) to Ld(j). With this arrangement, it is possible to reduce the area ratio of the portion outside the tactile presentation enabled area in the transparent insulating substrate 101.

The lead wiring layers 105, specifically the lead wiring layers Ld(1) to Ld(j) and the lead wiring layers Lu(1) to Lu(j), are preferably formed of either a monolayer metal film or a stacked film of a monolayer metal film and a monolayer nonmetal film. When the stacked film has a lower layer and an upper layer that covers the lower layer, the upper layer may function as a protective layer for the lower layer. For example, the upper layer serving as a protective layer may protect the lower layer from an enchant during an etching process used in the manufacture of the tactile presentation screen 150. Alternatively, the upper layer may function as a cap layer that prevents corrosion in the lower layer during manufacture or use of the tactile presentation screen 150. If the lower layer is made of a material that is superior to the material for the upper layer in adhesion to the transparent insulating substrate 101, the occurrence of exfoliation in the lead wiring layers 105 can be reduced.

Summary of Effects

According to the present embodiment, firstly, since the first electrodes 102a and the second electrodes 102b are disposed in the same layer with an interval therebetween (see FIG. 3), the structure is simplified, and the first electrodes 102a and the second electrodes 102b form no intersections. This eliminates the need to increase the thickness of the dielectric layer 106 in order to flatten asperities at the intersections. Accordingly, it is possible to prevent the static electric force acting on the indicator 2 from being weakened due to the thick dielectric layer 106. Secondly, the voltage signal $V_a$ of the first frequency and the voltage signal $V_b$ of the second frequency are applied respectively applied to the first electrodes 102a and the second electrodes 102b, which are alternately disposed with an interval therebetween. As a result, a static electric force generated by a modulating signal that is generated by a combination of the two voltage signals and that is amplified more than the input signals acts on the indicator 2 that has touched a region extending over first and second electrodes 102a and 102b via the dielectric layer 106. Accordingly, it is possible to cause a stronger static electric force to act on the indicator 2 than in the case where a single voltage signal is applied. From the above, a strong enough tactile sensation can be creased with lower voltage signals.

In the case where the pitch $P_E$ of the tactile electrodes 102 is less than or equal to 7 mm (FIG. 15), a finger severing as the indicator 2 that moves on the tactile presentation panel 100 is more likely to always be located in a region extending over first and second electrodes 102a and 102b than in the case where the pitch $P_E$ takes other values. In this case, it is possible to give a tactile sensation continuously to the indicator 2.

In the case where the lead wiring layers 105 (FIG. 12) are formed of either a monolayer metal film or a stacked film of a monolayer metal film and a monolayer nonmetal film, the area necessary to dispose the lead wiring layers can be reduced because wiring resistance can be suppressed sufficiently without much increasing the sectional area of the lead wiring layers. Alternatively, it is possible to improve the freedom with which the lead wiring layers 105 can be designed, because wiring resistance can be suppressed sufficiently even if the lead wiring layers 105 are somewhat long.

In the case where the dielectric layer 106 includes a film having a relative permittivity of 10 or more, it is possible to increase the static electric force that acts on the indicator 2 more remarkably than in the case where only a material having a low relative permittivity can be used.

The voltage supply circuit 110 (FIG. 18) performs the operation of applying the voltage signal $V_a$ simultaneously to all of the first electrodes 102a among the tactile electrodes 102 and applying the voltage signal $V_b$ simultaneously to all of the second electrodes 102b among the tactile electrodes 102. In that case, there is no need to selectively apply a voltage signal to specific ones of the first electrodes 102a or specific ones of the second electrodes 102b. This simplifies the configuration of the voltage supply circuit 110.

The voltage supply circuit 110 (FIG. 18) may reference the information detected by the touch detection circuit 210. This allows the tactile presentation touch panel 400 to create a tactile sensation by referencing the information about touching. Note that the information detected by the touch detection circuit 210 may be referenced directly, or may be referenced indirectly via the touch coordinate calculation circuit 214.

Embodiment 2

Figure 23:
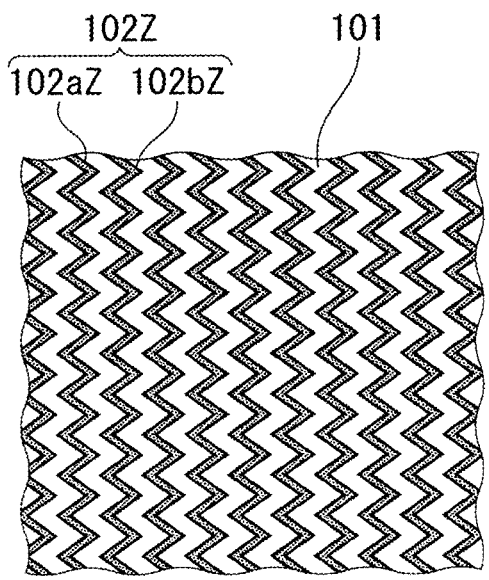
FIG. 23 is a plan view schematically illustrating a configuration of tactile electrodes according to Embodiment 2 of the present invention.

FIG. 23 is a plan view schematically illustrating tactile electrodes 102Z that are used in the present embodiment, instead of the tactile electrodes 102 (FIG. 12: Embodiment 1). The tactile electrodes 102Z include first electrodes 102aZ and second electrodes 102bZ, instead of the first electrodes 102a and the second electrodes 102b. Although each tactile electrode 102 extends linearly, each tactile electrode 102Z includes bends.

In the case where each tactile electrode 102 extends linearly in one direction as in Embodiment 1, the strength of a tactile sensation to be created depends greatly on the relationship between the one direction and the slide direction of the indicator 2. Superficially, referring to FIG. 12, when the indicator 2 slides in the longitudinal direction in FIG. 12 on the tactile electrodes 102 according to Embodiment 1, a tactile sensation becomes less likely to be created. In contrast, according to the present embodiment, such direction dependence can be reduced by causing the tactile electrodes 102Z to include bends.

Embodiment 3

Figure 24:
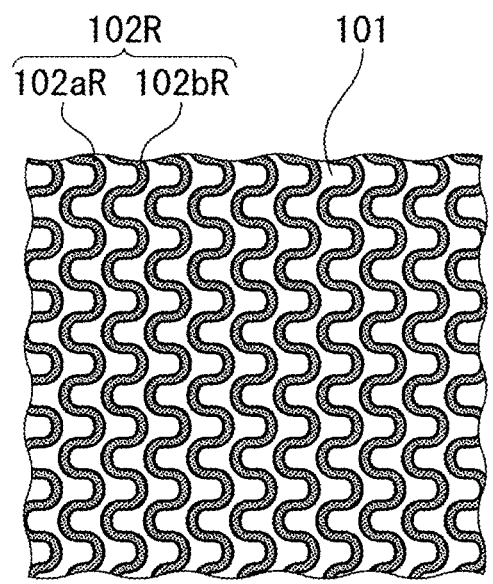
FIG. 24 is a plan view schematically illustrating a configuration of tactile electrodes according to Embodiment 3 of the present invention.

FIG. 24 is a plan view schematically illustrating a configuration of tactile electrodes 102R that are used in the present embodiment, instead of the tactile electrodes 102 (FIG. 12: Embodiment 1). The tactile electrodes 102R include first electrodes 102aR and second electrodes 102bR, instead of the first electrodes 102a and the second electrodes 102b. Although each tactile electrode 102 extends linearly, each tactile electrode 102R includes bends as in Embodiment 2. Each tactile electrode 102R further has extension directions spanning all directions on the transparent insulating substrate 101. Superficially, in a broad view, each tactile electrode 102R extends in the longitudinal direction in FIG. 24. However, in a microscopic view, each tactile electrode 102R includes portions that extend in longitudinal, oblique, and lateral directions, and as a result, has extension directions spanning all directions.

According to the present embodiment, the tactile electrodes 102R have extension directions spanning all directions. Accordingly, it is possible to create a tactile sensation according to a wider range of slide directions than in Embodiment 2.

Embodiment 4

Figure 25:
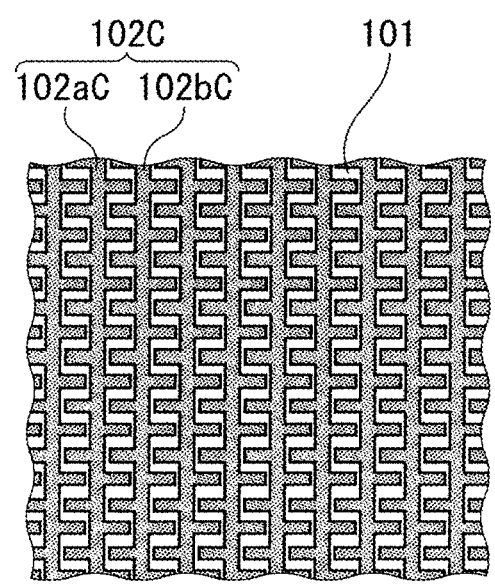
FIG. 25 is a plan view schematically illustrating a configuration of tactile electrodes according to Embodiment 4 of the present invention.

FIG. 25 is a plan view schematically illustrating a configuration of tactile electrodes 102C that are used in the present embodiment, instead of the tactile electrodes 102 (FIG. 12: Embodiment 1). The tactile electrodes 102C include first electrodes 102aC and second electrodes 102bC, instead of the first electrodes 102a and the second electrodes 102b. Each tactile electrode 102C includes an extension that extends linearly in one direction (longitudinal direction in FIG. 25) and a plurality of protrusions that protrude from the above extension in a direction (lateral direction in FIG. 25) different from the one direction. Each protrusion of a second electrode 102bC enters the space between adjacent protrusions of a first electrode 102aC. Also, each protrusion of a first electrode 102aC enters the space between adjacent protrusions of a second electrode 102bC. In this way, the tactile electrode 102C has a so-called comb-toothed structure.

According to the present embodiment, the provision of the aforementioned extensions of the tactile electrodes 102C can shorten the wiring length to approximately the same length as in Embodiment 1 and thereby allows the wiring resistance to be maintained at a certain low level. Moreover, the provision of the aforementioned protrusions of the tactile electrodes 102C allows the outer edges of the tactile electrodes 102C to extend in various directions. Accordingly, it is possible to reduce the dependence of the strength of tactile sensations on the slide direction of the indicator 2 as in Embodiment 2.

Embodiment 5

Figure 26:
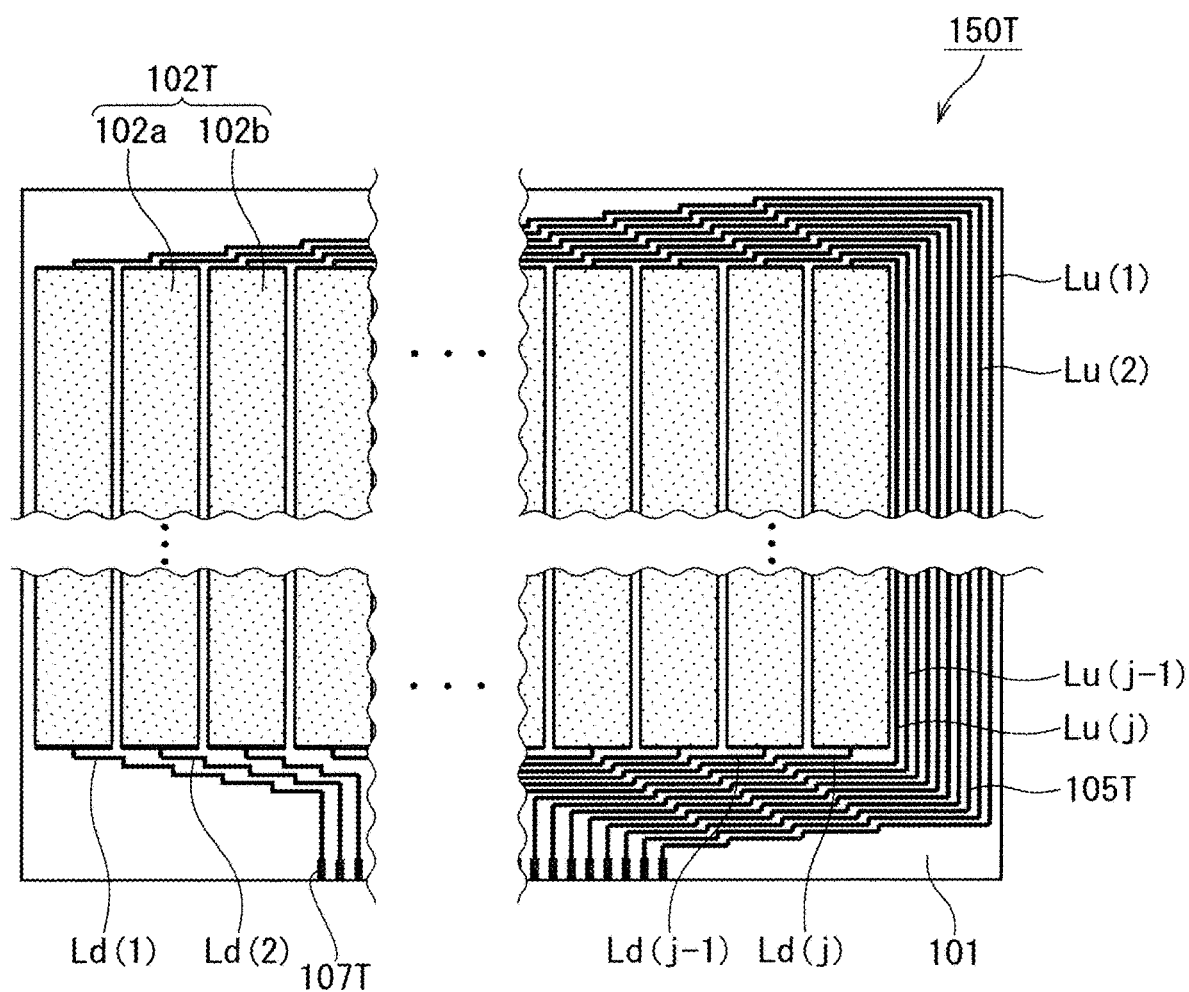
FIG. 26 is a plan view schematically illustrating a configuration of a tactile presentation screen according to Embodiment 5 of the present invention.

FIG. 26 is a plan view schematically illustrating a configuration of a tactile presentation screen 150T according to the present embodiment. The tactile presentation screen 150T uses transparent tactile electrodes 102T as the tactile electrodes 102 (FIG. 12). The tactile presentation screen 150T also uses transparent lead wiring layers 105T as the lead wiring layers 105 (FIG. 12). Also, a transparent tactile presentation panel terminal area 107T may be used as the tactile presentation panel terminal area 107 (FIG. 12). The shape of the tactile electrodes 102T may be any one of the shapes of the tactile electrodes according to Embodiments 1 to 4.

According to the present embodiment, the same material can be used for the tactile electrodes 102T and the lead wiring layers 105T while providing the transparent tactile electrodes 102T. This simplifies the process.

The configuration other than that described above is approximately the same as any one of the configurations according to Embodiments 1 to 4 described above, and therefore description thereof is not repeated.

Embodiment 6

Figure 27:
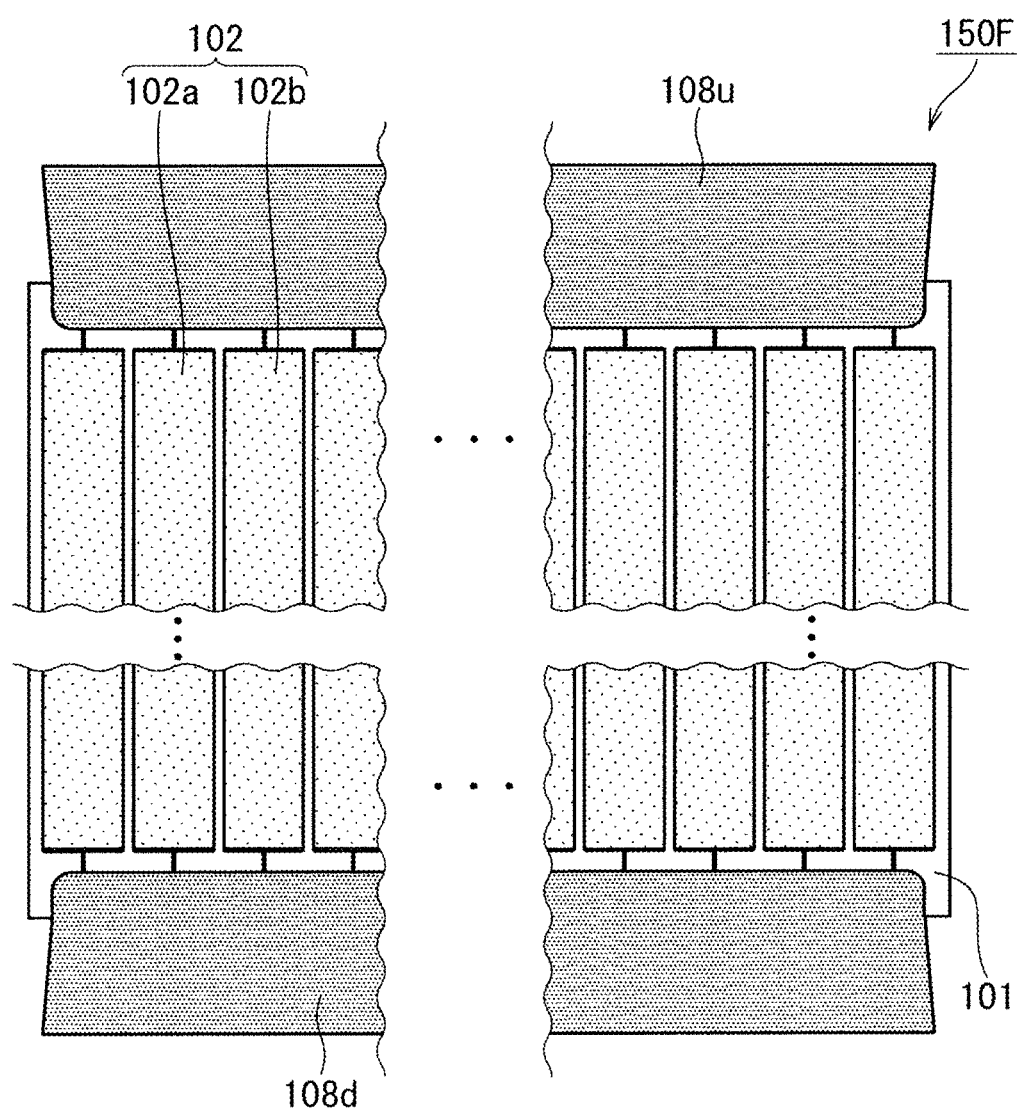
FIG. 27 is a plan view schematically illustrating a configuration of a tactile presentation screen according to Embodiment 6 of the present invention.

FIG. 27 is a plan view schematically illustrating a configuration of a tactile presentation screen 150F according to the present embodiment. The tactile presentation screen 150F includes a pair of FPCs 108d and 108u, instead of the lead wiring layers 105 (FIG. 12). The FPCs 108d and 108u are connected respectively to one and the other ends of each tactile electrode 102 in the extension direction.

According to the present embodiment, it is possible to omit some or all of the lead wiring layers 105 (FIG. 12). This increases the proportion of the tactile presentation enabled area in the transparent insulating substrate 101.

The configuration other than that described above is approximately the same as any one of the configurations according to Embodiments 1 to 5 described above, and therefore description thereof is not repeated.

Embodiment 7

Figure 28:
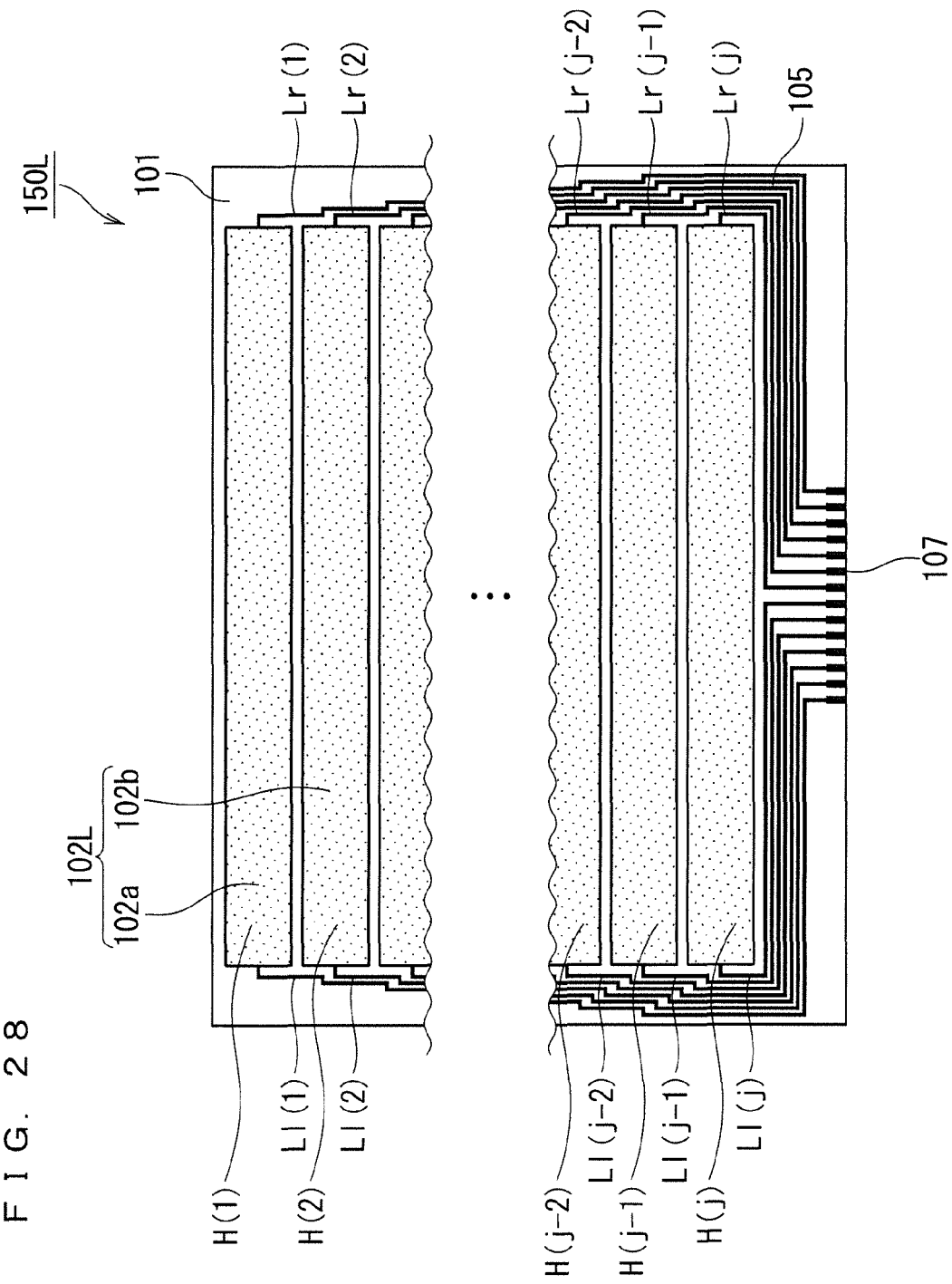
FIG. 28 is a plan view schematically illustrating a configuration of a tactile presentation screen according to Embodiment 7 of the present invention.

FIG. 28 is a plan view schematically illustrating a configuration of a tactile presentation screen 150L according to the present embodiment. The tactile presentation screen 150L uses tactile electrodes 102L, instead of the tactile electrodes 102 (FIG. 12). Each tactile electrode 102L extends in an extension direction (lateral direction in FIG. 28). The tactile electrodes 102L are aligned with an interval therebetween in an alignment direction (longitudinal direction in FIG. 28). Specifically, tactile electrodes H(1) to H(j) are orderly aligned as the tactile electrodes 102L. In the illustrated example, a transparent insulating substrate 101 has a rectangular shape having long and short sides, and the tactile presentation screen 150L correspondingly has long and short sides. In the illustrated example, the alignment direction is along the short sides. If the vertical direction viewed by an observer of the tactile presentation screen 150L is along the short sides, the aforementioned alignment direction is along the vertical direction.

The tactile presentation screen 150L (FIG. 28) includes lead wiring layers Ll(1) to Ll(j) and lead wiring layers Lr(1) to Lr(j). Lead wiring layers Ll(k) and Lr(k) are each connected to a tactile electrode H(k), where k is an integer from 1 to j. The lead wiring layers Ll(k) and Lr(k) are connected respectively to one and the other ends of the tactile electrode H(k) in the extension direction from the tactile presentation panel terminal area 107. The tactile presentation panel terminal area 107 is disposed along a long side of the transparent insulating substrate 101 in the vicinity of the center of the long side.

According to the present embodiment, the tactile electrodes 102L are aligned in the vertical direction as viewed by the observer. This enables the user to more continuously perceive a tactile sensation when the slide direction of the indicator 2 (FIG. 2) is the vertical direction or close to the vertical direction. Thus, for example in the case where vertical sliding is used heavily as in the case of a control panel for elevator car, it is preferable for the tactile electrodes 102L to be aligned in the vertical direction as viewed by the observer as in the present embodiment. Conversely, in the case where horizontal sliding is used heavily, it is preferable for the tactile electrodes to be aligned in the horizontal direction as viewed by the observer. In this way, it is preferable that the alignment direction of the tactile electrodes is set according to the application of the tactile presentation touch display (FIG. 2).

Although each tactile electrode 102L in FIG. 28 extends linearly in the extension direction, the fine structures described in Embodiments 2 to 4 may be employed. In this case, it is possible to reduce adverse effects that can be caused when the slide direction is deviated from the vertical direction. Alternatively, at least either of the configurations according to Embodiments 5 and 6 described above may be employed.

Embodiment 8

Figure 29:
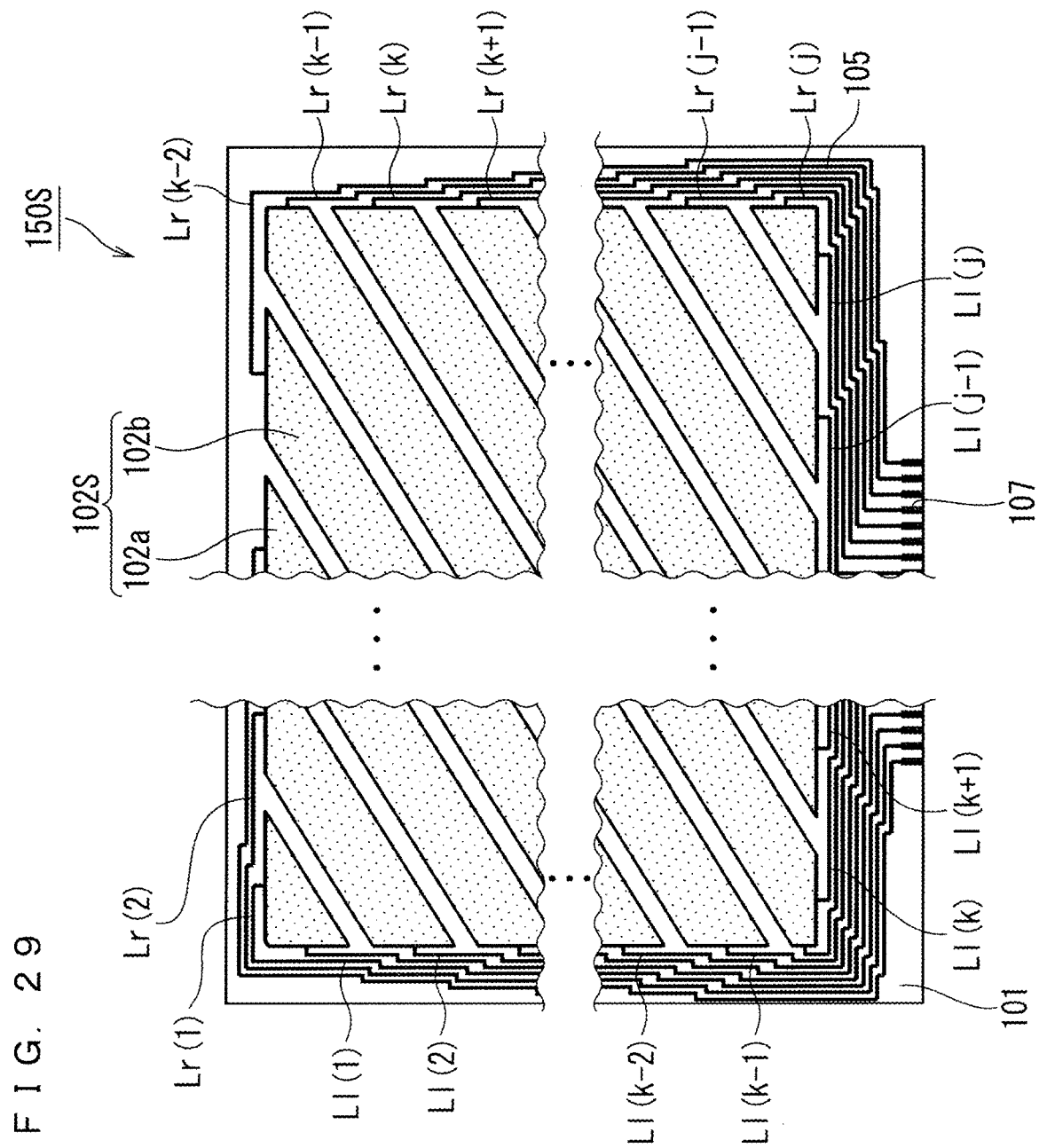
FIG. 29 is a plan view schematically illustrating a configuration of a tactile presentation screen according to Embodiment 8 of the present invention.

FIG. 29 is a plan view schematically illustrating a configuration of a tactile presentation screen 150S according to the present embodiment. The tactile presentation screen 150S uses tactile electrodes 102S, instead of the tactile electrodes 102 (FIG. 12). Each tactile electrode 102S extends in an extension direction (oblique direction from the lower left to the upper right in FIG. 29). The tactile electrodes 102S are aligned with an interval therebetween in an alignment direction (oblique direction from the upper left to the lower right in FIG. 29). In the illustrated example, a transparent insulating substrate 101 has a rectangular shape having long and short sides, and the tactile presentation screen 150S correspondingly has long and short sides. In the illustrated example, the alignment direction is inclined to each of the short and long sides. If the horizontal and vertical directions as viewed by an observer of the tactile presentation screen 150S are respectively along the long and short sides, the aforementioned alignment direction is inclined to each of the horizontal and vertical directions.

According to the present embodiment, the alignment direction of the tactile electrodes 102S are inclined to each of the horizontal and vertical directions as viewed by the observer. This prevents the alignment direction and the slide direction of the indicator 2 (FIG. 2) from becoming orthogonal to each other, irrespective of whether the slide direction is the horizontal direction or the vertical direction. Accordingly, in applications in which the indicator 2 is assumed to slide mainly in the horizontal or vertical direction, it is possible to avoid a situation in which a tactile sensation becomes less likely to be created due to the slide direction and the alignment direction being orthogonal to each other. In these applications, even if each tactile electrode 102S extends simply linearly, or in other words, the tactile electrodes 102S are aligned simply in stripes as illustrated in FIG. 29, it is possible to create a strong enough tactile sensation almost always and to simplify the configuration of the tactile presentation screen.

In some applications, the fine structures described in Embodiments 2 to 4 may be employed. In this case, it is possible reduce adverse effects that can be caused when the slide direction is deviated from the alignment direction. Alternatively, at least either of the configurations according to Embodiments 5 and 6 described above may be employed.

Embodiment 9

Figure 30:
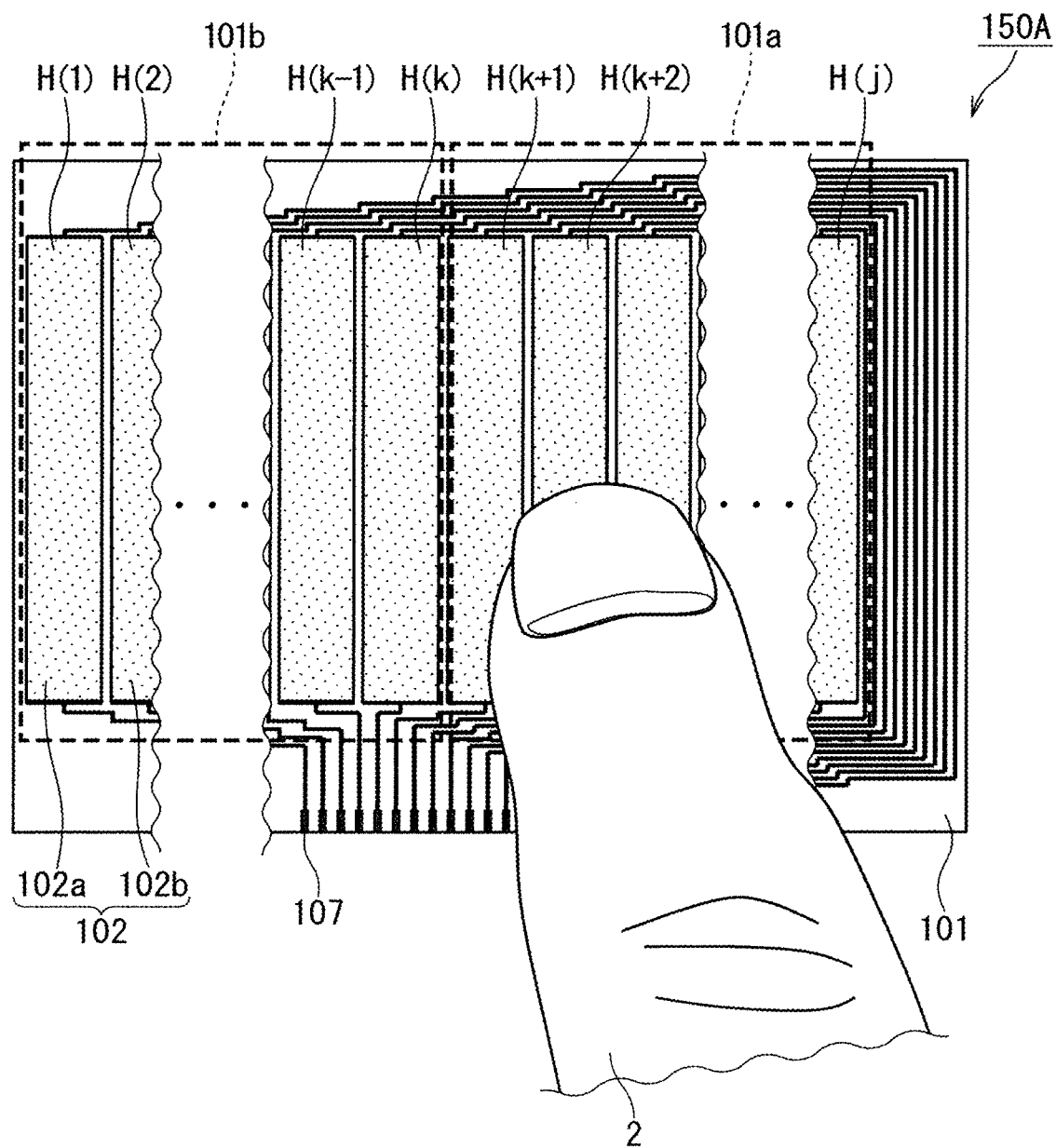
FIG. 30 is a plan view illustrating, together with an indicator, a configuration of a tactile presentation screen according to Embodiment 9 of the present invention.
Figure 31:
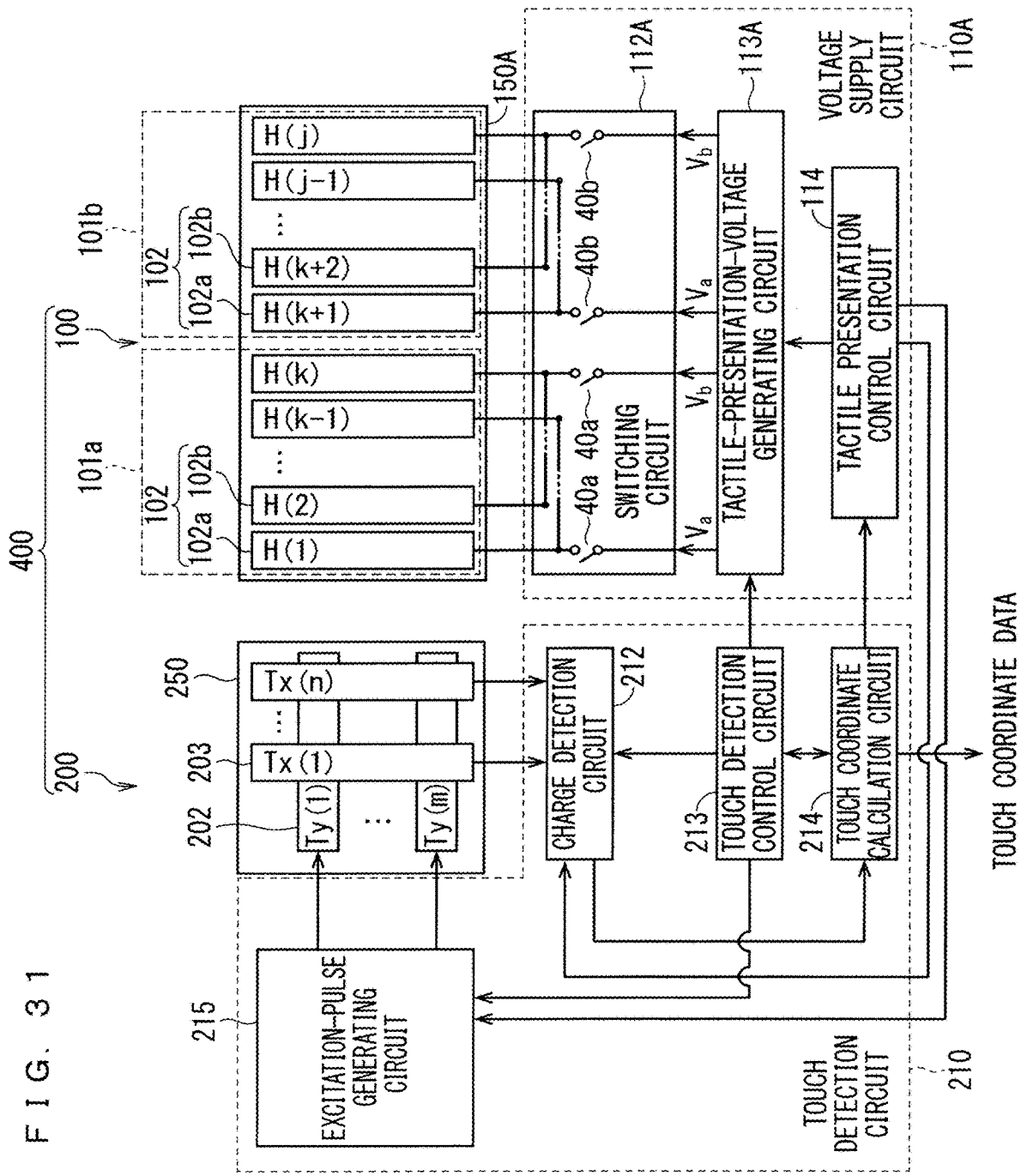
FIG. 31 is a block diagram schematically illustrating configurations of a touch panel and a tactile presentation panel including the tactile presentation screen in FIG. 30.

FIG. 30 is a plan view illustrating a configuration of a tactile presentation screen 150A according to the present embodiment, together with the indicator 2. FIG. 31 is a block diagram schematically illustrating configurations of a touch panel 200 and a tactile presentation panel 100 that includes the tactile presentation screen 150A.

First electrodes 102a and second electrodes 102b, included in tactile electrodes 102, are alternately disposed in the entire tactile presentation enabled area. According to the present embodiment, a transparent insulating substrate 101 includes a plurality of segmented regions 101a and 101b. The tactile electrodes 102 are distributed into a plurality of electrode groups disposed respectively on the segmented regions 101a and 101b. Each electrode group includes a plurality of electrodes among the first electrodes 102a and a plurality of electrodes among the second electrodes 102b. In the illustrated example, the tactile electrodes 102 are distributed into an, electrode group of tactile electrodes H(1) to H(k) and an electrode group of tactile electrodes H(k+1) to H(j). The number of groups is any number greater than or equal to two.

A voltage supply circuit 110A is configured to be capable of selecting to which of the electrode groups the voltage signals are applied. In other words, the voltage supply circuit 110A is capable of applying the voltage signals to only a specific group among the electrode groups while preventing the voltage signals from being applied to the other group. This specific group is selected based on whether the indicator 2 is located on the segmented region 101a or on the segmented region 101b. The voltage signals are applied to the electrode group corresponding to the segmented region on which the indicator 2 is located.

To carry out the above-described operation, a tactile-presentation-voltage generating circuit 113A receives, from a tactile presentation control circuit 114, information that can be used to specify whether the indicator 2 is located on the segmented region 101a or on the segmented region 101b. This information may be touch coordinate data, or may be data that directly indicates a specific segmented region.

A switching circuit 112A includes a pair of switches 40a and a pair of switches 40b that correspond respectively to the segmented regions 101a and 101b. More generally speaking, a plurality of pairs of switches are provided corresponding respectively to the plurality of segmented regions. In the case where the voltage signals are applied to the electrode group corresponding to the segmented region 101a, the pair of switches 40a is turned on and the pair of switches 40b is turned off in response to a command received from the tactile-presentation-voltage generating circuit 113A.

The pair of switches 40a may be controlled in conjunction with each other. One and the other of the two switches 40a2 are configured to control the supply of the voltage signal $V_a$ of the first frequency and the voltage signal $V_b$ of the second frequency, respectively. The one and the other of the two switches 40a are connected respectively to odd-numbered ones and even-numbered ones of the tactile electrodes H(1) to H(k). Similarly, the pair of switches 40b may be controlled in conjunction with each other. One and the other of the two switches 40b are configured to control the supply of the voltage signal $V_a$ of the first frequency and the voltage signal $V_b$ of the second frequency, respectively. The one and the other of the two switches 40b are connected respectively to odd-numbered ones and even-numbered ones of the tactile electrodes H(k+1) to H(j).

In the case where the indicator 2 is located in the vicinity of the boundary between segmented regions 101a and 101b, the voltage signals may be applied to both of the electrode groups corresponding to the segmented regions 101a and 101b in consideration of the possibility that the indicator 2 may go across the boundary.

The configuration other than that described above is approximately the same as any one of the configurations according to Embodiments 1 to 8 described above. Therefore, identical or corresponding constituent elements are given the same reference numerals, and description thereof is not repeated.

According to the present embodiment, the voltage supply circuit 110A is configured to be capable of selecting to which of the electrode groups the voltage signals are applied. This reduces power consumption. Moreover, according to the present embodiment, each electrode group includes a plurality of electrodes among the first electrodes 102a and a plurality of electrodes among the second electrodes 102b. By using these electrode groups as a unit to apply the voltage signals, it is possible to avoid a situation in which the circuit configuration becomes excessively complicated more than in the case where each electrode is controlled completely independently.

Embodiment 10

Figure 33:
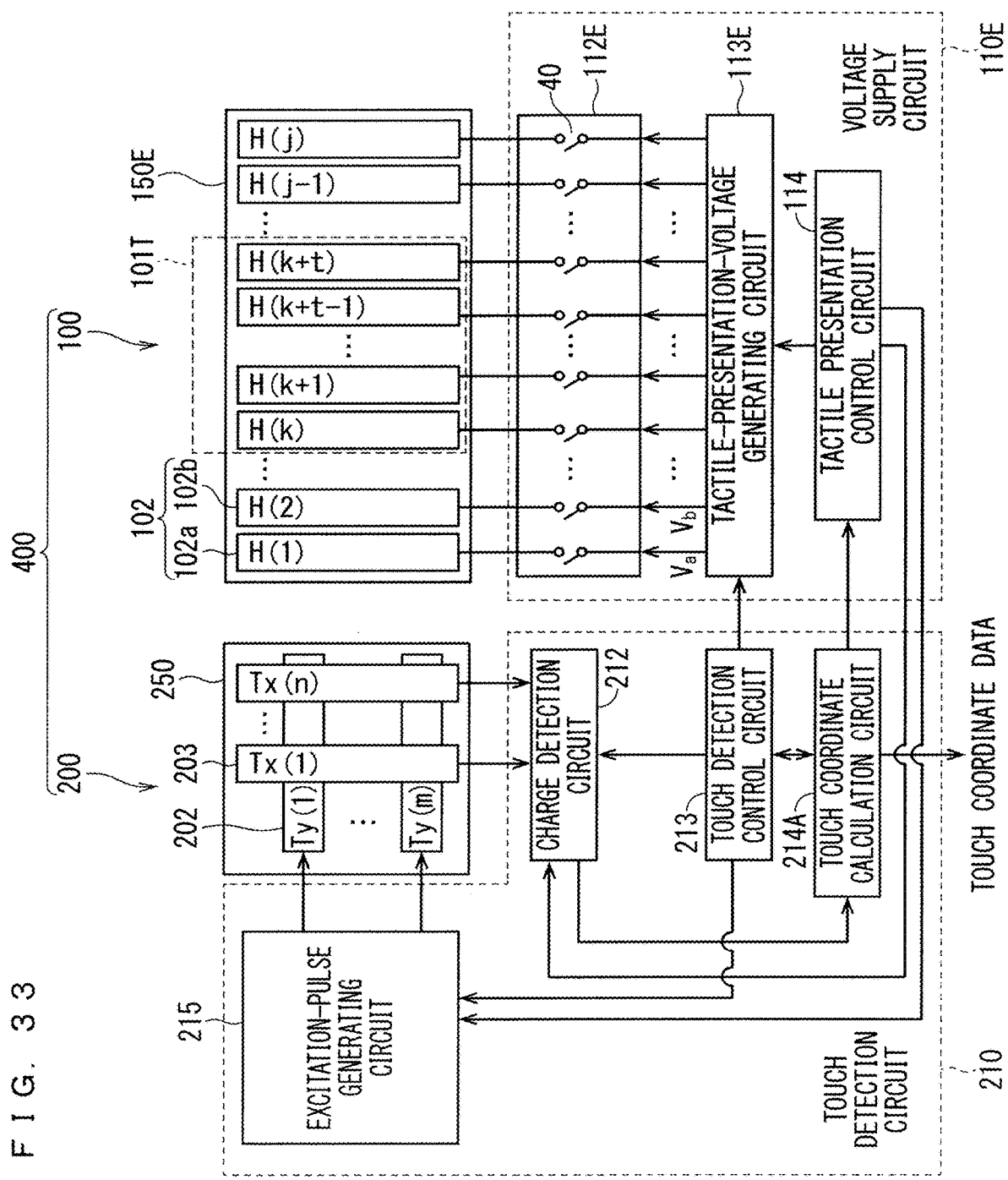
FIG. 33 is a block diagram schematically illustrating configurations of a touch panel and a tactile presentation panel including the tactile presentation screen in FIG. 32.

FIG. 32 is a plan view illustrating a configuration of a tactile presentation screen 150E according to the present embodiment, together with the indicator 2. FIG. 33 is a block diagram schematically illustrating configurations of a touch panel 200 and a tactile presentation panel 100 that includes the tactile presentation screen 150E.

A voltage supply circuit 110E is configured to be capable of selecting whether or not to apply voltage signals to each of a plurality of tactile electrodes 102. Specifically, the voltage supply circuit 110E is capable of applying voltage signals to only those of the tactile electrodes 102 that are located on a specific partial region 101T of the transparent insulating substrate 101 while not applying the voltage signals to the other electrodes. This partial region 101T is a region including a point touched by the indicator 2 and may be set to a predetermined range centering on the touched point.

To carry out the above-described operation, a tactile-presentation-voltage generating circuit 113E receives, from the tactile presentation control circuit 114, information that enables specifying what portion of the transparent insulating substrate 101 is touched by the indicator 2. As this information, the present embodiment uses touch position coordinates and the size (hereinafter, referred to as a "touch size") of a contact surface CT (FIG. 3). The touch position coordinates and the touch size are calculated by the touch coordinate calculation circuit 214A. The touch size can be calculated from a distribution of the degree of decrease in the amount of charge in the detection electrodes 203. The tactile-presentation-voltage generating circuit 113E determines the partial region 101T on the basis of the information about the touch position coordinates and the touch size. A region in which those of the tactile electrodes H(1) to H(j) that are at least partly touched by the indicator 2 via the dielectric layer 106 (FIG. 3) is determined as being included in the partial region 101T. Alternatively, a predetermined range centering on a region set by the above determination may be added to the partial region 101T. As another alternative, the size of the partial region 101T may be defined in advance.

In the example illustrated in FIG. 32, a region where tactile electrodes H(k+1) and H(k+2) touched by the indicator 2 are disposed is included in the partial region 101T, and using this region as the center, a region where a tactile electrode 11(k) is disposed and a region where a tactile electrode H(k+3) is disposed are included in the partial region 101T. This situation corresponds to a situation in which the partial region 101T illustrated in FIG. 33 is defined by t=3. As illustrated in FIG. 33, the voltage signals are applied to two or more orderly aligned tactile electrodes 11(k) to H(k+t) among the orderly aligned tactile electrodes H(1) to 11(j).

A switching circuit 112E includes a plurality of switches 40 connected respectively to the tactile electrodes H(1) to H(j). Each of these switches 40 can operate independently in response to a command received from the tactile-presentation-voltage generating circuit 113E. When a certain switch 40 is turned on, a voltage signal is applied to a corresponding one of the tactile electrodes H(1) to Ha). Switches 40 that are connected to odd-numbered ones of the tactile electrodes H(1) to Ha) are configured to control the supply of the voltage signal $V_a$ of the first frequency, and switches 40 that are connected to even-numbered ones are configured to control the supply of the voltage signal $V_b$ of the second frequency.

The configuration other than that described above is approximately the same as any one of the configurations according to Embodiments 1 to 8 described above. Therefore, identical or corresponding constituent elements are given the same reference numerals, and description thereof is not repeated.

According to the present embodiment, the voltage supply circuit 110E is configured to be capable of selecting whether or not to apply the voltage signals to each of the tactile electrodes 102. Accordingly, it is possible at each time to apply the voltage signals to only tactile electrodes 102 that are estimated to contribute to the creation of a tactile sensation. This significantly reduces power consumption.

Embodiment 11

Electrode Shape

Figure 34:
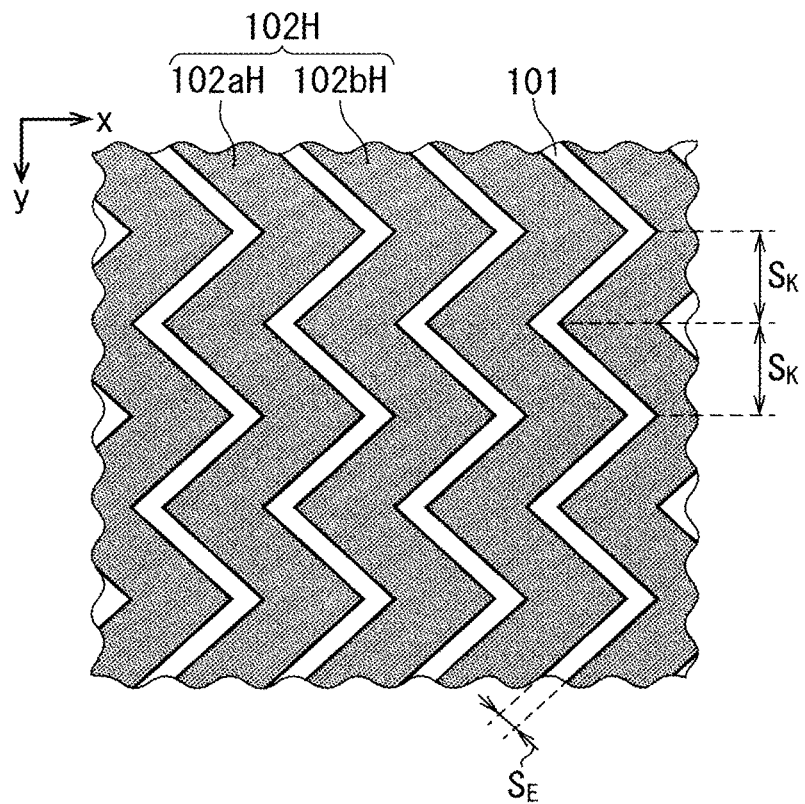
FIG. 34 is a plan view schematically illustrating a configuration of tactile electrodes according to Embodiment 11 of the present invention.

FIG. 34 is a plan view schematically illustrating a configuration of tactile electrodes 102H that are used in the present embodiment, instead of the tactile electrodes 102 (FIG. 12: Embodiment 1). The tactile electrodes 102H include first electrodes 102aH and second electrodes 102bH, instead of the first electrodes 102a and the second electrodes 102b (FIG. 12). Although each tactile electrode 102 extends linearly, each tactile electrode 102H has bends. This enables arranging longer tactile electrodes and thereby increasing the area of contact between the tactile electrodes and the indicator 2. Accordingly, a stronger tactile sensation can be created by greater capacitances formed between the indicator 2 and the tactile electrodes.

Specifically, each tactile electrode 102H, or in other words each of the first and second electrodes 102aH and 102bH, extends in one extension direction (longitudinal direction in FIG. 34) in a broad view, but has bends in a microscopic view. The intervals between these bents are hereinafter referred to as intervals $S_K$. More specifically, since each tactile electrode 102H has bends in a microscopic view, local points at which the edges of the tactile electrode 102H become exactly parallel to the above extension direction exist at regular intervals by repetition along the extension direction of the tactile electrode 10211. The intervals between these points correspond to the intervals $S_K$.

Dependence of Difference in Tactile Sensation Caused by Direction of Movement of Indicator 2 on Electrode Shape A tactile sensation created by the tactile electrodes depends on how the tactile electrodes extend. This will be described hereinafter.

Figure 35:
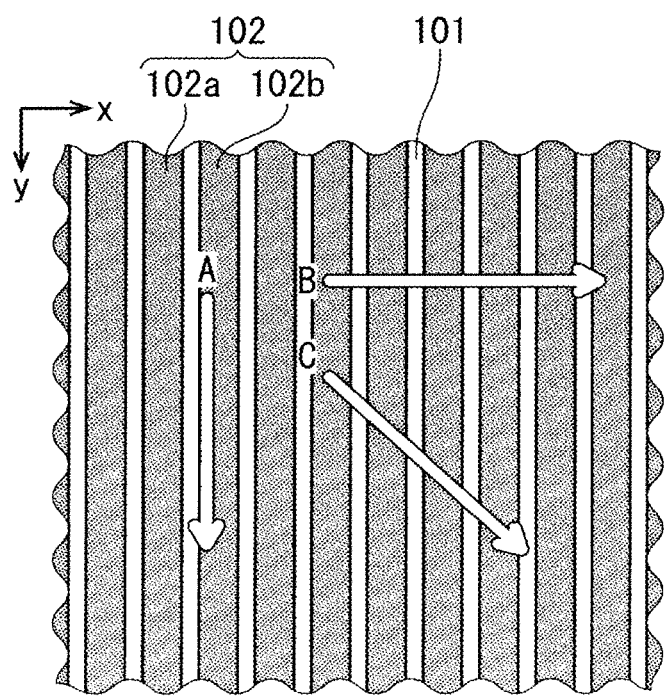
FIG. 35 is a plan view illustrating how the indicator slides when each tactile electrode extends linearly in one direction.

Referring to FIG. 35, a case is first described in which each tactile electrode 102 extends linearly in one direction (longitudinal direction in FIG. 35) as described previously in Embodiment 1. In this case, a tactile sensation to be created depends greatly on the relationship between this one direction and the slide direction of the indicator 2. In FIG. 35, arrows A, B, and C respectively represent cases where the slide directions are at angles of 0°, +45°, and +90° in the counterclockwise direction with respect to the extension direction (downward direction in FIG. 35) of the tactile electrodes. Each pair of adjacent first and second electrodes 102aH and 102bH forms a capacitance with the indicator 2, and an electric field is generated due to this capacitance. In the case of the tactile electrodes 102 that extend linearly in the 0-degree direction (longitudinal direction in FIG. 35), electric fields along the +90-degree direction (lateral direction in FIG. 35) are distributed continuously in the 0-degree direction. In the case where the slide direction of the indicator 2 is along the arrow A, the indicator 2 moves within the electric field generated by the same pair of electrodes. On the other hand, in the case where the slide direction of the indicator 2 is along the arrow B or C, the indicator 2 moves across electric fields generated by different pairs of electrodes. Consequently, there are great differences in tactile sensation among the arrows A, B, and C.

Figure 36:
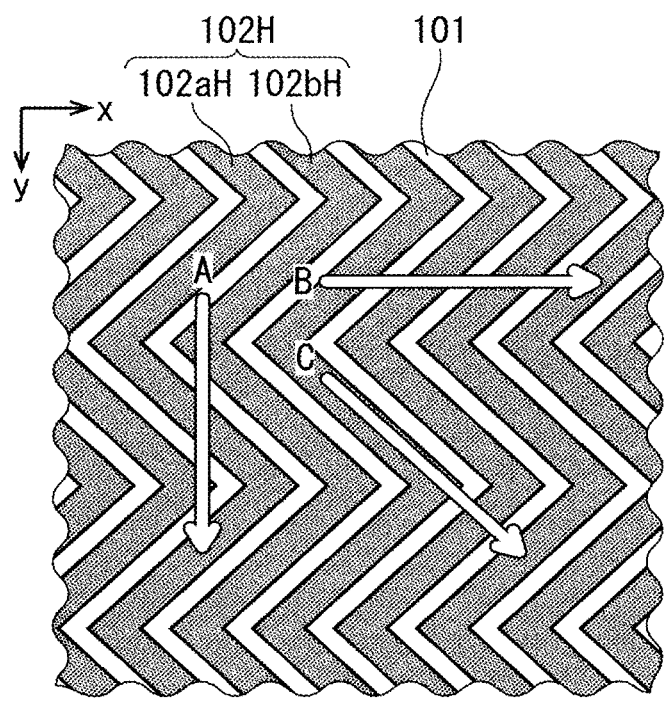
FIG. 36 is a plan view illustrating how the indicator slides when each tactile electrode extends in a zigzag in one direction.

In contrast, in the case of Embodiment 11, for example as illustrated in FIG. 36, the tactile electrodes 102H extend in the 0-degree direction (longitudinal direction in FIG. 36) in a broad view, but extends in a zigzag in the +45- and −45-degree directions in a microscopic view. Accordingly, electric fields along the ±45-degree directions are distributed in a zigzag. As a result, in any of the cases of the arrows A, B, and C, the indicator 2 moves across electric fields generated by different pairs of electrodes. This consequently reduces differences in tactile sensation among the arrows A, B, and C. In other words, it is possible to reduce differences in tactile sensation, caused by the dependence on the direction of movement of the indicator 2.

In FIG. 36, the extension direction of the tactile electrodes includes two angle components, i.e., +45 and −45 degrees, but if the extension direction includes more angle components, the aforementioned dependence on direction can be reduced more effectively. For example, tan the case of the tactile electrodes 102R (FIG. 24), the extension direction of which has arc components, the dependence on direction can be reduced remarkably. The angle components of the extension direction of the tactile electrodes are preferably optimized in consideration of the slide direction of the indicator 2 on the tactile presentation touch display on which the tactile electrodes are provided.

Generation of Diffracted Light

Figure 37:
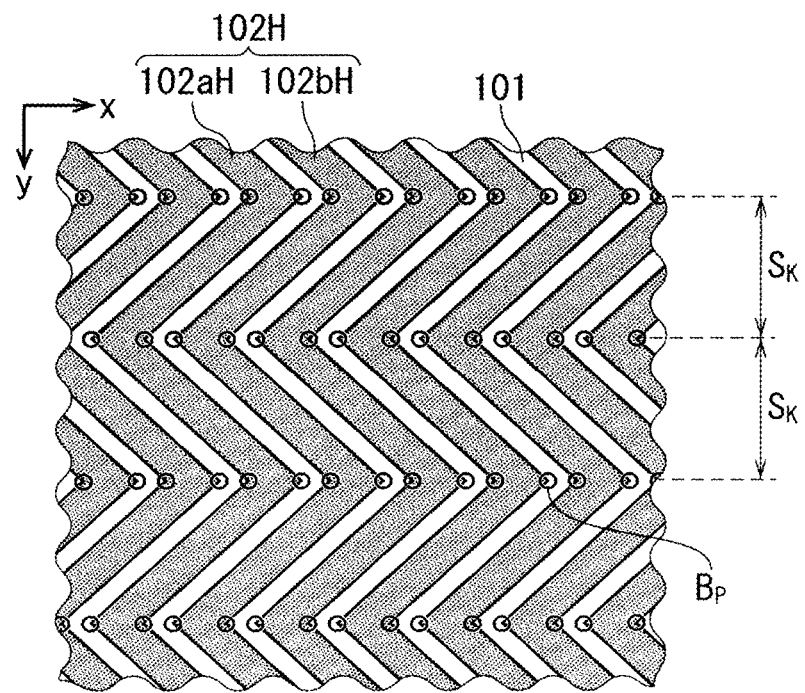
FIG. 37 is a plan view illustrating how bright points are generated at local locations of the tactile electrodes in FIG. 34.

Referring to FIG. 37, since each tactile electrode 102H has bends in a microscopic view, the edges of the tactile electrode 102H have local points $B_P$ that become exactly parallel to the extension direction as described above. In FIG. 37, these local points $B_P$ are indicated by small circles. When diffracted light is gathered, the local points $B_P$ can become brighter than the other points. In other words, bright points are likely to be generated at the local points B. In FIG. 37, each tactile electrode 102H has a plurality of linear portions that extend in oblique directions, and the boundaries of these linear portions correspond to the local points $B_P$. However, even in the case where each tactile electrode has no such linear portions, local points at which the edges of the tactile electrode become exactly parallel to the extension direction will exist as long as the tactile electrode has bends in a microscopic view.

As illustrated in FIG. 37, the bright points can have a grid-like arrangement. Reflected light on such a grid-like pattern can be explained based on a theory similar to Fraunhofer diffracton for transmitted light on a grid-like pattern. The light intensity distribution $I_1(x)$ of the diffracted light can be expressed by the following equations:

$$I_1(x) = \frac{\omega^2[1 - \cos(2\omega X)]}{2(\omega X)^2} \quad \text{Equation 1}$$

where $I_1(x)$ is the light intensity distribution of the diffracted light in the x-axial direction, ω is the interelectrode distance, and X is the distance from the center of the diffracted light.

$$X = \frac{\pi x}{\lambda L} \quad \text{Equation 2}$$

where L is the visual range, and λ is the wavelength.

In general, diffracted light having the next strongest light intensity to light (zero-order diffracted light) that corresponds to the light travelling in straight lines along the optical axis is called plus or minus first-order diffracted light. According to the above equations, the light intensity of the plus or minus first-order diffracted light is approximately 4% of that of the zero-order diffracted light. In the case where the local points $B_P$ are arranged at regular intervals as illustrated in FIG. 37, bright points are in lines and visually recognized as single emission lines by the naked eye. Specifically, in the case where the intervals in the X direction between the bright points are smaller than the intervals in the Y direction therebetween as illustrated in FIG. 37, the bright points aligned in the X direction are in lines and visually recognized as single emission lines extending in the X direction. Since the above lines are arranged with an equal pitch in the Y direction, a plurality of emission lines are visually recognized as being arranged with an equal pitch in the Y direction. That is, a bright-and-dark stripe pattern is visually recognized. Note that how the emissions lines are viewed by the observer is determined by factors such as the brightness of the bright points, the arrangement of the local points $B_P$ and the visual range (distance between the display and the observer).

Figure 38:
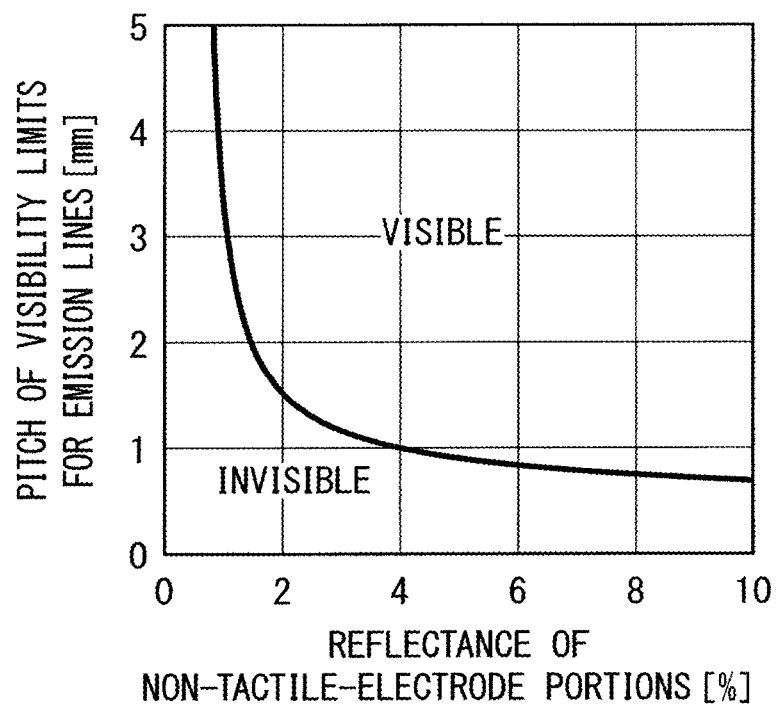
FIG. 38 is a graph illustrating whether a bright-and-dark stripe pattern is visible or invisible, using the relationship between the pitch of emission lines and the reflectance of non-tactile electrodes.

FIG. 38 is a graph illustrating whether the bright-and-dark stripe pattern is visible or invisible when the visual range is 500 mm, using the relationship between the pitch of the emission lines and the reflectance of non-tactile-electrode portions (in other words, the reflectance of portions where the tactile electrodes do not exist). Boundary lines between visible regions and invisible regions correspond to the pitch of visibility limits. The pitch of visibility limits can be expressed by the following equation (Document: Electronic Journal R&D, Review of Toyota CRDL., Vol. 35, No. 2).

$$P_R = D_V \times \frac{x}{360\left(\frac{1}{\sigma}\ln\frac{L_a^* - L_b^*}{A}\right)^{\frac{t}{r}}} \quad \text{Equation 3}$$

where $P_R$ is the pitch of visibility limits, $D_V$ is the visual range, $L^*_a$ is the lightness of the emission lines, $L^*_b$ is the lightness of the background region, and σ, A, and γ are parameters determined by spatial resolution and environments.

A stripe pattern with a narrower pitch than the pitch of visibility limits is not visually recognized, and a stripe pattern with a wider pitch than the pitch of visibility limits is visually recognized. The visual range of 500 nm used as a calculation condition in the graph in FIG. 38 has been selected, assuming a situation where a display disposed in a vehicle is operated by touching with a driver's finger. A typical distance between the driver and the vehicle-mounted display is 750 mm, but this distance is considered to be reduced during touch operations, so that the value of 500 mm has been selected. The reflectance of the portions where the tactile electrodes are not disposed (non-tactile-electrode portions) is approximately 4% according to a typical example of the present embodiment, and at this time, the pitch of visibility limits for the emission lines is 1 mm according to the graph in FIG. 38. Therefore, if the pitch of the emission lines is less than or equal to 1 mm, the possibility of the emissions lines being visually recognized by the observer can be reduced sufficiently. The table below shows the result of a study of whether the emission lines with a pitch corresponding to the intervals $S_K$ is visually recognized on condition that the visual range is 500 mm.

TABLE 1

| Interval $S_K$ [mm] | 5 | 2.5 | 1.27 | 1 | 0.7 | 0.5 |
|---|---|---|---|---|---|---|
| Spatial Frequency (1/$S_K$) [cycle/mm] | 0.2 | 0.4 | 0.79 | 1 | 1.43 | 2 |
| Visibility of Emission Lines | Visible | Visible | Visible | Invisible | Invisible | Invisible |

The above table shows that the emission lines are not visually recognized when the pitch, i.e., the intervals $S_K$, are less than or equal to 1 mm, but are visually recognized when the pitch is greater than 1 mm. Alternatively, an index matching (IM) layer that adjusts the refractive index may be formed between the tactile electrodes and the transparent insulating substrate. The IM layer can reduce reflected light and thereby reduce the lightness of the emission lines. Therefore, in this case, even if the pitch of the emission lines is greater than or equal to 1 mm, the emission lines will not be visually recognized. As the visual range increases from 500 mm, the emission lines become less likely to be visually recognized even if the pitch of the emission lines is greater than or equal to 1 mm.

Summary of Effects

According to the present embodiment, each tactile electrode 102H has bends. Accordingly, it is possible to reduce differences in tactile sensation, caused by the dependence on the direction of movement of the indicator 2. Also, the provision of bends increases the electrode length, so that larger capacitances are formed between a finger and the electrodes. Accordingly, it is possible to create a strong enough tactile sensation with lower voltage signals.

The visibility of the emission lines consisting of a plurality of bright points caused by diffracted light can be reduced by setting the intervals $S_K$, which are the intervals of the bends, to be less than or equal to 1 mm. Accordingly, a stripe pattern that is irrelevant to the original image but caused by the arrangement of the tactile electrodes becomes less likely to be visually recognized by the observer.

Embodiment 12

Figure 39:
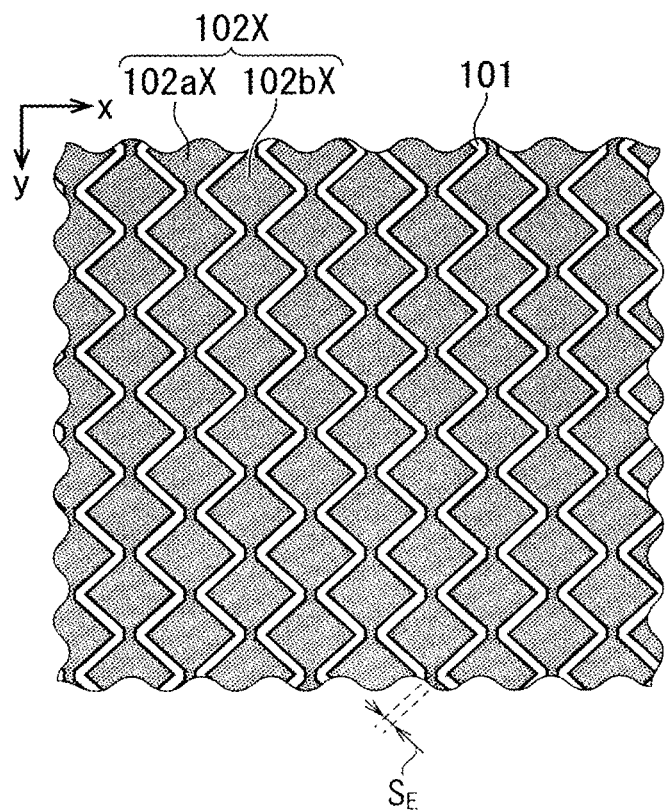
FIG. 39 is a plan view schematically illustrating a configuration of tactile electrodes according to Embodiment 12 of the present invention.

FIG. 39 is a plan view schematically illustrating a configuration of tactile electrodes 102X that are used in the present embodiment, instead of the tactile electrodes 102 (FIG. 12: Embodiment 1). The tactile electrodes 102X include first electrodes 102aX and second electrodes 102bX, instead of the first electrodes 102a and the second electrodes 102b (FIG. 12). Although each tactile electrode 102 extends linearly and has a rectangular shape, each tactile electrode 102X has a shape formed by connecting a plurality of rhombuses and therefore have bends. In the illustrated configuration, rectangular portions that extend linearly and have a smaller width than the width of the rhombuses are disposed between the rhombuses. The first electrodes 102aX and the second electrodes 102bX are displaced so as to be shifted a half of the periodic arrangement of the aforementioned rhombuses. The edges of the first and second electrodes 102aX and 102bX extend in parallel with an interval therebetween, and the interval between these edges in a direction perpendicular to the edges corresponds to an interelectrode distance $S_E$.

According to the present embodiment, with the provision of the bends of each tactile electrode, it is possible to reduce differences in tactile sensation, caused by the dependence of the direction of movement of the indicator 2 in almost the same manner as in Embodiment 11. According to the present embodiment, since each tactile electrode 102X has rhombuses, one and the other edges of each tactile electrode (right and left sides of the rhombuses in FIG. 39) can extend in different directions. This increases the variety of the directions of electric fields generated by the tactile electrodes. Accordingly, it is possible to further increase the effect of reducing differences in tactile sensation, caused by the dependence on the direction of movement of the indicator 2.

Although the interelectrode distance $S_E$ remains constant in FIG. 39, the interelectrode distance $S_E$ does not necessarily have to remain constant. A preferable dimension of the interelectrode distance $S_E$ is similar to that in Embodiment 1.

Although the bends are arranged with an equal pitch in the X and Y directions in FIG. 39, the bends may be arranged at irregular intervals. In this case, groups of bright points become less likely to be visually recognized. Accordingly, a stripe pattern that is irrelevant to the original image but caused by the arrangement of the tactile electrodes becomes less likely to be visually recognized by the observer.

Embodiment 13

Figure 40:
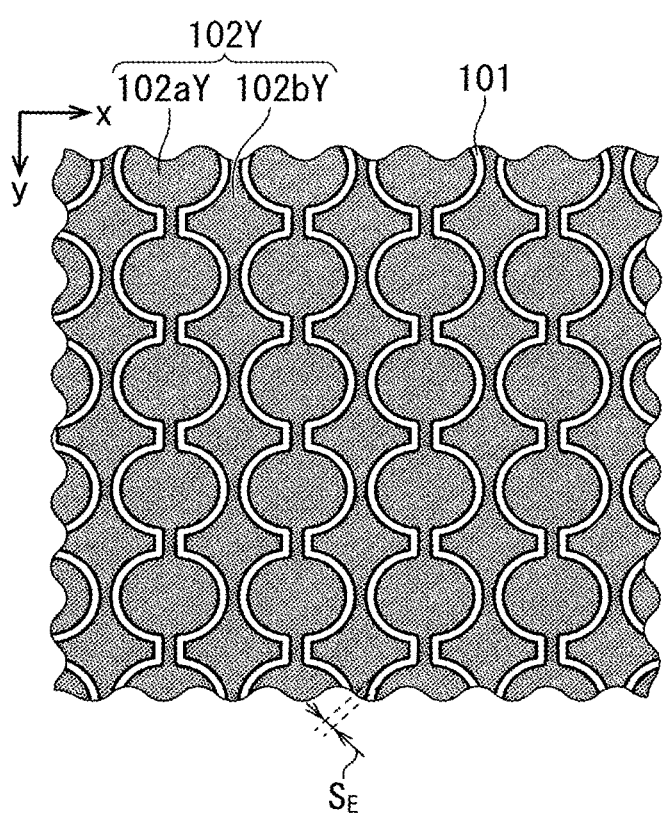
FIG. 40 is a plan view schematically illustrating a configuration of tactile electrodes according to Embodiment 13 of the present invention.

FIG. 40 is a plan view schematically illustrating a configuration of tactile electrodes 102Y that are used in the present embodiment, instead of the tactile electrodes 102 (FIG. 12: Embodiment 1). The tactile electrodes 102Y include first electrodes 102aY and second electrodes 102bY, instead of the first electrodes 102a and the second electrodes 102b (FIG. 12). Each first electrode 102aY has a shape formed of connecting a plurality of ellipses and therefore have bends. In the illustrated configuration, rectangular portions that extend linearly and have a smaller width than the width of the ellipses are disposed between the ellipses. Alternatively, the ellipses may be circles. Each second electrode 102bY has a shape formed of connecting a plurality of recesses having edges that oppose the aforementioned ellipses with an interval therebetween, and therefore have bends. In the illustrated configuration, rectangular portions that extend linearly with a maximum width of the recesses are arranged between the recesses. The edges of the first and second electrodes 102aY and 102bY extend in parallel with an interval therebetween, and the interval between these edges in a direction perpendicular to the edges corresponds to the interelectrode distance $S_E$.

The present embodiment can achieve approximately the same effect as that of Embodiment 12.

According to the present embodiment, each first electrode 102aY has ellipses. The extension directions of the edges of the ellipses span almost all directions when viewed as a whole. Also, each second electrode 102bY has recesses. The extension directions of the edges of the recesses span almost all directions when viewed as a whole. Therefore, the variety of the directions of electric fields generated by the tactile electrodes can be increased remarkably. Accordingly, it is possible to remarkably increase the effect of reducing differences in tactile sensation, caused by the dependence on the direction of movement of the indicator 2.

Although the interelectrode distance $S_E$ in FIG. 40 remains constant, the interelectrode distance $S_E$ does not necessarily have to remain constant. A preferable dimension of the interelectrode distance $S_E$ is similar to that in Embodiment 1.

While the invention has been shown and described in detail, the foregoing description is in all aspects illustrative and not restrictive. It is therefore to be understood that numerous modifications and variations can be devised without departing from the scope of the invention.

EXPLANATION OF REFERENCE SIGNS 102, 102C, 102L, 102H, 102R, 102S, 102T, 102X, 102Y, 102Z: tactile electrode, 105, 105T: lead wiring layer, 203: detection electrode, 1: tactile presentation touch display, 2: indicator, 106: dielectric layer, 10a, 10b: adhesive, 40, 40a, 40*b*: switch, 100: tactile presentation panel, 101: transparent insulating substrate, 101T: partial region, 101*a*, 101*b*: segmented region, 102*a*, 102*a*C, 102*a*H, 102*a*R, 102*a*X, 102*a*Y, 102*a*Z: first electrode, 102*b*, 102*b*C, 102*b*H, 102*b*R, 102*b*X, 102*b*Y, 102*b*Z: second electrode, 107, 107T: tactile presentation panel terminal area, 108, 108*d*, 108*u* FPC, 110, 110A, 110E: voltage supply circuit, 112, 112A, 112E: switching circuit, 113, 113A, 113E: tactile-presentation-voltage generating circuit, 113*a*: first voltage generating circuit, 113*b*: second voltage generating circuit, 114: tactile presentation control circuit, 150, 150A, 150E, 150F, 150L, 150S, 150T: tactile sensation presentation screen, 200: touch panel, 201: substrate, 204: interlayer insulation layer, 205: insulation layer, 206: row-direction wiring layer, 206B: bridge, 207: column-direction wiring layer, 208: touch screen terminal area, 209: shield wiring layer, 210: touch detection circuit, 212: charge detection circuit, 213: touch detection control circuit, 214, 214A: touch coordinate calculation circuit, 215: excitation-pulse generating circuit, 250, 250*a*, 250*b*: touch screen, 300: display panel, 400: tactile presentation touch panel.

The invention claimed is:

1. A tactile presentation panel, comprising:
   a transparent insulating substrate;
   a plurality of tactile electrodes including a plurality of first electrodes and a plurality of second electrodes, the plurality of first electrodes and the plurality of second electrodes being alternately arranged with an interval therebetween without intersections in a same layer on the transparent insulating substrate, each of the plurality of tactile electrodes having a longest dimension that extends in an extension direction;
   a dielectric layer that covers the plurality of tactile electrodes; and
   a voltage supply circuit that applies a voltage having a first frequency to first electrodes that are located on at least a partial region of the transparent insulating substrate among the plurality of first electrodes, and applies a voltage signal having a second frequency different from the first frequency to second electrodes that are located on at least the partial region of the transparent insulating substrate among the plurality of second electrodes;
   a tactile presentation panel terminal area disposed discontinuously along one side of the transparent insulating substrate so as to be exposed from the dielectric layer, and connected to the voltage supply circuit; and
   a plurality of lead wiring layers disposed on the transparent insulating substrate, and connected to the tactile presentation panel terminal area and to one end and another end of the plurality of tactile electrodes in the extension direction.

2. The tactile presentation panel according to claim 1, wherein
   the voltage supply circuit applies the voltage signal having the first frequency simultaneously to all of the plurality of first electrodes among the plurality of tactile electrodes, and applies the voltage signal having the second frequency simultaneously to all of the plurality of second electrodes among the plurality of tactile electrodes.

3. The tactile presentation panel according to claim 1, wherein
   the transparent insulating substrate includes a plurality of segmented regions,
   the plurality of tactile electrodes are classified into a plurality of electrode groups that are disposed respectively on the plurality of segmented regions, each of the plurality of electrode groups includes a plurality of ones of the plurality of first electrodes and a plurality of ones of the plurality of second electrodes, and
   the voltage supply circuit is configured to be able to select to which of the plurality of electrode groups the voltage signals are applied.

4. The tactile presentation panel according to claim 1, wherein
   the voltage supply circuit is configured to be capable of selecting whether to apply the voltage signals to each of the plurality of tactile electrodes.

5. The tactile presentation panel according to claim 1, wherein
   the plurality of lead wiring layers extend to the plurality of tactile electrodes correspondingly so as to achieve shortest distances in order from one of the plurality of lead wiring layers that is located closer to a center of alignment in the tactile presentation panel terminal area.

6. The tactile presentation panel according to claim 1, wherein
   the dielectric layer covers the plurality of tactile electrodes, and includes a film having a relative permittivity of 10 or more, and
   each of the plurality of first electrodes and each of the plurality of second electrodes that are adjacent to each other are arranged with a pitch less than or equal to 7 mm.

7. The tactile presentation panel according to claim 6, wherein
   the plurality of tactile electrodes have an interelectrode distance less than or equal to 0.1 mm therebetween.

8. The tactile presentation panel according to claim 6, wherein
   each of the plurality of tactile electrodes has a bend.

9. The tactile presentation panel according to claim 8, wherein
   each of the plurality of tactile electrodes has extension directions spanning all directions on the transparent insulating substrate.

10. The tactile presentation panel according to claim 6, wherein
    each of the plurality of tactile electrodes has a plurality of bends that have an interval less than or equal to 1 mm therebetween.

11. The tactile presentation panel according to claim 6, wherein
    each of the plurality of tactile electrodes includes an extension that extends in one direction and a plurality of protrusions that protrude from the extension in directions different from the one direction.

12. The tactile presentation panel according to claim 6, further comprising:
    a plurality of lead wiring layers disposed on the transparent insulating substrate and connected to the plurality of tactile electrodes, the plurality of lead wiring layers being formed of either a monolayer metal film or a stacked film of a monolayer metal film and a monolayer nonmetal film, the monolayer metal film and the stacked film having resistance lower than resistance of a transparent conductive film.

13. The tactile presentation panel according to claim 6, further comprising:
    a plurality of lead wiring layers disposed on the transparent insulating substrate and connected to the plurality of tactile electrodes, the plurality of tactile electrodes and the plurality of lead wiring layers being formed of either a monolayer metal film or a stacked film of a monolayer metal film and a monolayer nonmetal film, the monolayer metal film and the stacked film having resistance lower than resistance of a transparent conductive film.

14. The tactile presentation panel according to claim 6, further comprising:
a plurality of lead wiring layers disposed on the transparent insulating substrate and connected to the plurality of tactile electrodes, the plurality of lead wiring layers being transparent.

15. A tactile presentation touch panel including the tactile presentation panel according to claim 1, the tactile presentation touch panel comprising:
the tactile presentation panel; and
a touch detection circuit that detects a touch position on the transparent insulating substrate,
wherein the voltage supply circuit references information detected by the touch detection circuit.

16. A tactile presentation touch display including the tactile presentation touch panel according to claim 15, the tactile presentation touch display comprising:
the tactile presentation touch panel;
a touch screen including a row-direction wiring layer and a column-direction wiring layer, the row-direction wiring layer and the column-direction wiring layer being made of a transparent conductive film; and
a display panel on which the tactile presentation touch panel and the touch screen are mounted,
wherein each of the plurality of tactile electrodes is formed of either a monolayer metal film or a stacked film of a monolayer metal film and a monolayer nonmetal film, the monolayer metal film and the stacked film having resistance lower than resistance of the transparent conductive film.

17. A tactile presentation touch display including the tactile presentation panel according to claim 1, the tactile presentation touch display comprising:
the tactile presentation panel; and
a display panel on which the tactile presentation panel is mounted,
the tactile presentation panel generating a tactile sensation by controlling a static electric force acting on an indicator to change a frictional force acting on the indicator.

18. The tactile presentation panel according to claim 1, wherein
the dielectric layer includes a film having a relative permittivity of 10 or more; and
each of the plurality of first electrodes and each of the plurality of second electrodes that are adjacent to each other are arranged with a pitch less than or equal to 7 mm.

19. The tactile presentation panel according to claim 1, wherein the longest dimension of each of the plurality of tactile electrodes extends in the same extension direction.

20. A tactile presentation panel, comprising:
a transparent insulating substrate;
a plurality of tactile electrodes including a plurality of first electrodes and a plurality of second electrodes, the plurality of first electrodes and the plurality of second electrodes being alternately arranged with an interval therebetween on a first surface of the transparent insulating substrate;
a dielectric layer that covers the plurality of tactile electrodes;
a voltage supply circuit that applies a voltage having a first frequency to first electrodes that are located on at least a partial region of the transparent insulating substrate among the plurality of first electrodes, and applies a voltage signal having a second frequency different from the first frequency to second electrodes that are located on at least the partial region of the transparent insulating substrate among the plurality of second electrodes;
a tactile presentation panel terminal area disposed discontinuously along one side of the first surface of the transparent insulating substrate so as to be exposed from the dielectric layer, and connected to the voltage supply circuit; and
a plurality of lead wiring layers each disposed entirely on the first surface of the transparent insulating substrate, and connected to the tactile presentation panel terminal area and to one end and another end of each of the plurality of tactile electrodes in an extension direction.

21. The tactile presentation panel according to claim 20, wherein none of the plurality of lead wiring layers intersect each other in a plan view of the tactile presentation panel.

* * * * *